United States Patent
Rao

(10) Patent No.: US 12,500,921 B2
(45) Date of Patent: Dec. 16, 2025

(54) SYSTEMS AND METHODS FOR DATA PROTECTION UTILIZING MODELERS

(71) Applicant: Wells Fargo Bank, N.A., San Francisco, CA (US)

(72) Inventor: Abhijit Bhima Rao, Irvine, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 139 days.

(21) Appl. No.: 18/381,347

(22) Filed: Oct. 18, 2023

(65) Prior Publication Data

US 2025/0133101 A1   Apr. 24, 2025

(51) Int. Cl.
*H04L 9/40* (2022.01)

(52) U.S. Cl.
CPC ...... *H04L 63/1433* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 10,958,673 B1* | 3/2021 | Chen | H04L 63/1466 |
| 11,170,334 B1* | 11/2021 | Orzechowski | G06N 5/02 |
| 11,218,471 B1* | 1/2022 | Stapleton | H04L 9/0668 |
| 11,343,270 B1* | 5/2022 | Carter, Jr. | H04L 9/088 |
| 11,887,126 B2* | 1/2024 | Umesh | G06Q 20/389 |
| 12,093,397 B1* | 9/2024 | Lin | G06F 21/577 |
| 12,206,702 B2* | 1/2025 | Routt | H04L 63/1441 |
| 2017/0061129 A1* | 3/2017 | Bektchiev | H04L 9/00 |
| 2021/0168166 A1* | 6/2021 | Liu | G06N 20/20 |
| 2021/0352087 A1* | 11/2021 | Ryver | G06F 21/577 |
| 2022/0070185 A1* | 3/2022 | Yang | H04L 63/1408 |

(Continued)

FOREIGN PATENT DOCUMENTS

CN   110430190 A   11/2019

OTHER PUBLICATIONS

Lasky, Nicholas et al., "Machine Learning Based Approach to Recommend MITRE ATT&CK Framework for Software Requirements and Design Specifications", (Feb. 10, 2023), https://arxiv.org/abs/2302.05530, pp. 1-4.

(Continued)

*Primary Examiner* — Backhean Tiv
(74) *Attorney, Agent, or Firm* — Foley & Lardner LLP

(57) ABSTRACT

Systems, methods, and computer-readable storage media for data protection. One system includes a data processing system including memory and one or more processors configured to determine one or more protection algorithms corresponding to one or more workstream elements of a workstream of one or more data systems. The processors are further configured to model one or more cybersecurity threats of the one or more data systems. The processors are further configured to map the one or more workstream elements of the workstream into the one or more cybersecurity threats based on one or more correlations between the one or more protection algorithms and the one or more cybersecurity threats. The processors are further configured to update a workstream element validation status of the one or more workstream elements based on the mapping of the one or more workstream elements.

20 Claims, 10 Drawing Sheets

(56) References Cited

U.S. PATENT DOCUMENTS

| | | | |
|---|---|---|---|
| 2022/0124108 A1* | 4/2022 | Gamble | G06F 16/907 |
| 2024/0348638 A1* | 10/2024 | Tejvir | G06F 21/577 |
| 2024/0414204 A1* | 12/2024 | Rund | H04L 63/1433 |
| 2025/0047698 A1* | 2/2025 | Rund | H04L 63/1425 |
| 2025/0133101 A1* | 4/2025 | Rao | H04L 63/1433 |

OTHER PUBLICATIONS

Oasis, "TAXII Version 2.0", (Jul. 19, 2017), %u2022 https://docs.oasis-open.org/cti/taxii/v2.0/taxii-v2.0.html, pp. 1-59.

* cited by examiner

SYSTEMS AND METHODS FOR DATA PROTECTION UTILIZING MODELERS

CROSS-REFERENCE TO RELATED APPLICATIONS

This application is related to U.S. patent application Ser. No. 18/047,900, titled "Systems And Methods for Automatically Selecting a Cryptographic Algorithm for a Post-Quantum Cryptography System", filed Oct. 19, 2022, which is incorporated herein by reference in its entirety and for all purposes.

BACKGROUND

In a computer networked environment, users and entities like individuals or companies may desire to protect data from quantum computers.

SUMMARY

Some arrangements relate to a system, including one or more data systems configured to execute a workstream, a first modeler configured to determine one or more protection algorithms corresponding to one or more workstream elements of the workstream, a second modeler configured to model one or more cybersecurity threats of the one or more data systems, and a mapping system. The mapping system is configured to map the one or more workstream elements of the workstream into the one or more cybersecurity threats based on one or more correlations between the one or more protection algorithms and the one or more cybersecurity threats, wherein the one or more correlations correspond to a cryptographic protection migration employing an alignment technique to align the one or more protection algorithms, determined by the first modeler, with the one or more cybersecurity threats, modeled by the second modeler, to generate a mapping that reduces a threat vector surface and update a workstream element validation status of the one or more workstream elements based on the mapping of the one or more workstream elements.

In some arrangements, the first modeler is a post-quantum cryptography (PQC) modeler further configured to determine a plurality of parameters for each of the one or more protection algorithms, and wherein the first modeler is further configured to output a plurality of tuples, each of the plurality of tuples including a protection algorithm and a corresponding legacy algorithm.

In some arrangements, the first modeler is further configured to map and correlate, utilizing a trained machine learning (ML) algorithm or a trained artificial intelligence (AI) algorithm, the one or more protection algorithms with the corresponding one or more workstream elements, utilizing a predefined and periodically updated database of algorithmic performance metrics and resource requirements of the one or more data systems.

In some arrangements, the second modeler is a harvest now decrypt later (HNDL) modeler further configured to analyze at least one of frameworks, threat models, or matrices to identify the one or more cybersecurity threats.

In some arrangements, modeling the one or more cybersecurity threats includes determining at least one of a short-term control to mitigate the one or more cybersecurity threats and a long-term control to mitigate the one or more cybersecurity threats.

In some arrangements, modeling the one or more cybersecurity threats includes generating a prioritization list of the one or more cybersecurity threats corresponding to lower an overall cybersecurity risk of the one or more data systems.

In some arrangements, the one or more data systems store a plurality of data assets utilized in the execution of the workstream, and wherein the one or more cybersecurity threats corresponds to data vulnerabilities of the plurality of data assets utilized in the execution of the workstream.

In some arrangements, before updating the workstream element validation status including updating the one or more workstream elements with the one or more protection algorithms, the one or more data systems encrypt and decrypt the plurality of data assets prior to receiving or sending a transmission that includes a plurality of encrypted data assets, and wherein the one or more data systems is configured to encrypt the plurality of data assets using one or more asymmetric keys.

In some arrangements, at least one of the one or more workstream elements remains unmapped, and wherein the mapping system further configured to identify one or more cybersecurity vulnerabilities or misconfigurations based on at least one unmapped workstream element, and prioritize mitigation techniques of the at least one unmapped workstream element based on a number of times the at least one unmapped workstream element is present in other workstreams.

In some arrangements, updating the workstream element validation status includes reflecting at least one of a state of mapping, a state of threat mitigation, or a state of algorithm selection of the workstream, and wherein the alignment technique is at least one of a clustering modeling technique or a distance modeling technique that aligns the first modeler and the second modeler.

In some arrangements, reducing the threat vector surface corresponds to a reduced set of potential attack pathways, optimized through alignment of the modeled one or more cybersecurity threats with corresponding the determined one or more cryptographic algorithms.

In some arrangements, each workstream element of the one or more workstream elements correspond to a cryptographic operation or a cybersecurity operation, and wherein the one or more protection algorithms include at least a cryptography algorithm or a hybrid cryptograph algorithm.

In some arrangements, a workstream element of the one or more workstream elements corresponds to (1) a first protection algorithm determined based on testing the workstream element against a closed source library and (2) a second protection algorithm determined based on testing the workstream element against an open source library.

In some arrangements, the mapping system is further configured to verify the updated workstream element validation status of the workstream against a same workstream element of a different workstream, wherein verifying includes identifying a valid difference or a valid consistency between the workstream and the different workstream, and wherein the valid difference is based on one or more different environmental requirements.

Some arrangements relate to a method of data protection, including determining, by one or more processing circuits, one or more protection algorithms corresponding to one or more workstream elements of a workstream of one or more data systems. The method further includes modeling, by the one or more processing circuits, one or more cybersecurity threats of the one or more data systems. The method further includes mapping, by the one or more processing circuits, the one or more workstream elements of the workstream into the one or more cybersecurity threats based on one or more correlations between the one or more protection algorithms and the one or more cybersecurity threats, wherein the one or more correlations correspond to a cryptographic protection migration employing an alignment technique to align the one or more protection algorithms with the one or more cybersecurity threats to generate the mapping that reduces a threat vector surface. The method further includes updating, by the one or more processing circuits, a workstream element validation status of the one or more workstream elements based on the mapping of the one or more workstream elements.

In some arrangements, determining the one or more protection algorithms further includes determining a plurality of parameters for each of the one or more protection algorithms, and wherein the determine the one or more protection algorithms further includes outputting a plurality of tuples, each of the plurality of tuples including a protection algorithm and a corresponding legacy algorithm.

In some arrangements, modeling the one or more cybersecurity threats includes determining at least one of a short-term control to mitigate the one or more cybersecurity threats and a long-term control to mitigate the one or more cybersecurity threats, and wherein modeling the one or more cybersecurity threats includes generating a prioritization list of the one or more cybersecurity threats corresponding to lower an overall cybersecurity risk of the one or more data systems.

In some arrangements, at least one of the one or more workstream elements remains unmapped, and wherein the method further includes identifying, by the one or more processing circuits, one or more cybersecurity vulnerabilities or misconfigurations based on at least one unmapped workstream element and prioritizing, by the one or more processing circuits, mitigation techniques of the at least one unmapped workstream element based on a number of times the at least one unmapped workstream element is present in other workstreams.

In some arrangements, each workstream element of the one or more workstream elements correspond to a cryptographic operation or a cybersecurity operation, and wherein the one or more protection algorithms include at least a cryptography algorithm or a hybrid cryptograph algorithm, and wherein a workstream element of the one or more workstream elements corresponds to (1) a first protection algorithm determined based on testing the workstream element against a closed source library and (2) a second protection algorithm determined based on testing the workstream element against an open source library.

Some arrangements relate to one or more non-transitory computer-readable storage media having instructions stored thereon that, when executed by at least one processing circuit, causes the at least one processing circuit to determine one or more protection algorithms corresponding to one or more workstream elements of a workstream of one or more data systems, model one or more cybersecurity threats of the one or more data systems, map the one or more workstream elements of the workstream into the one or more cybersecurity threats based on one or more correlations between the one or more protection algorithms and the one or more cybersecurity threats, wherein the one or more correlations correspond to a cryptographic protection migration employing an alignment technique to align the one or more protection algorithms with the one or more cybersecurity threats to generate a mapping that reduces a threat vector surface, and update a workstream element validation status of the one or more workstream elements based on the mapping of the one or more workstream elements.

Figure 1:
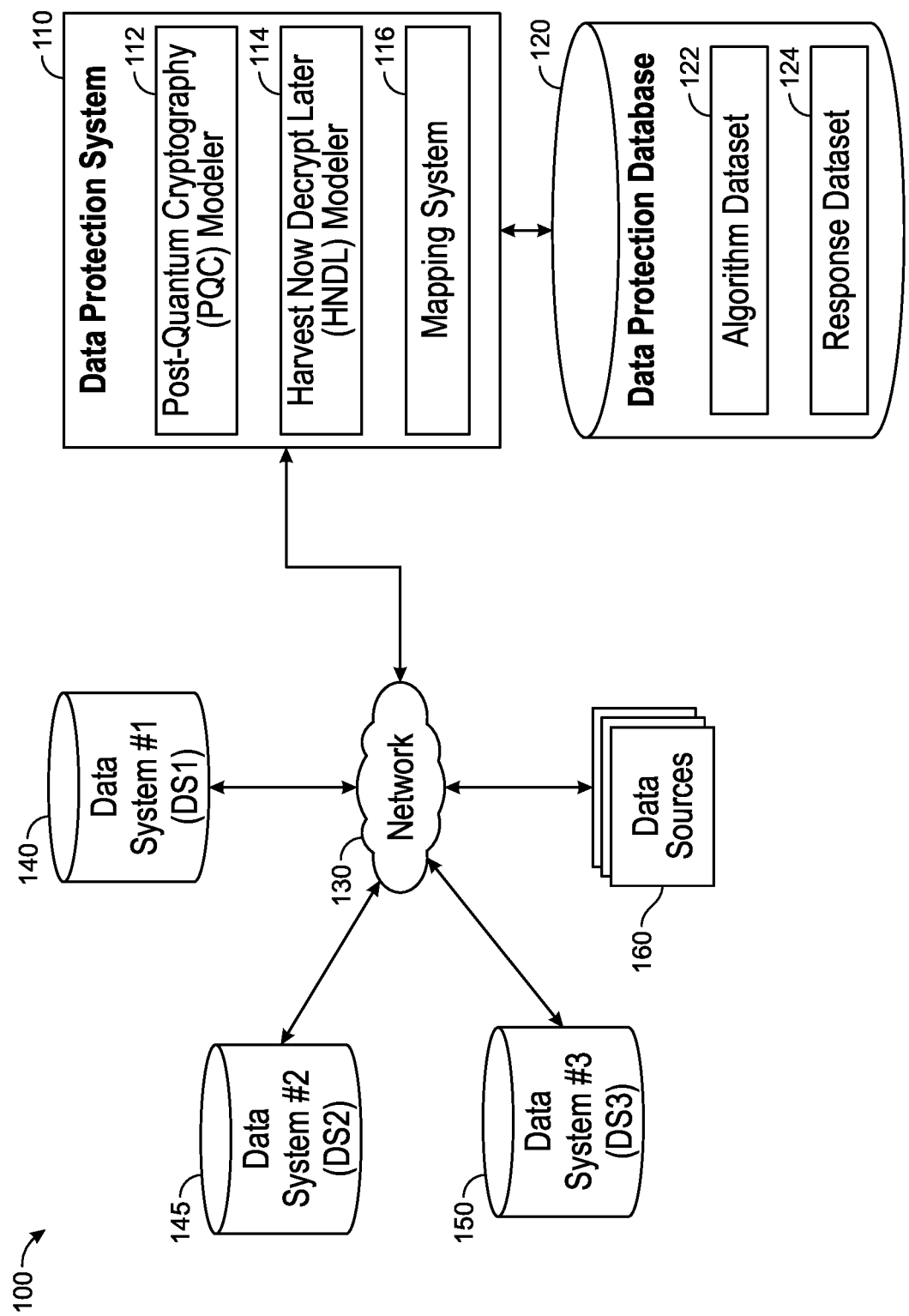
FIG. 1 is a block diagram depicting an example of a data protection system in a computing environment, according to some arrangements.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Referring generally to the figures, systems, apparatuses, methods, and non-transitory computer-readable media for data protection are presented. In some arrangements, the technological framework involves the utilization of the Post Quantum Cryptography (PQC) modeler and the Harvest Now Decrypt Later (HNDL) modeler to improve data protection architectures and implementations against potential quantum computational threats. The PQC modeler provides improvements to enterprise systems through a transition to quantum-resistant cryptographic algorithms by evaluating and selecting algorithms based on specific workflow requirements, performance metrics of those algorithms and implementation impacts. Additionally, the HNDL modeler analyzes and models potential malicious acts, forming a cybersecurity matrix that identifies and evaluates threats, vulnerabilities, and risks. Together, PQC modeler and HNDL modeler facilitate systematic modeling and mitigation of data exposure risks by ensuring that every data element protected by asymmetric cryptography is tracked, evaluated, and, if necessary, migrated to a more secure algorithm or storage strategy. Furthermore, the systems and methods employ a detailed matrix and mapping system, ensuring that each cryptographic migration path is accurately accounted for and any potential vulnerabilities or threats are adequately mitigated, enhancing the robustness of the data protection protocol in a quantum-enabled future.

Accordingly, the integration of the PQC modeler and HNDL modeler improves data protection in several technical dimensions. The PQC modeler systematically chooses quantum-resistant algorithms, improving protection associated with potential future quantum computing threats, and thereby stabilizing the encryption framework that safeguards long-lifespan data. In particular, PQC modeler and HNDL modeler strengthen or fortify encryption frameworks against the advancing capabilities of quantum computing, thus stabilizing the safeguarding mechanisms for data with an extended shelf lives. Additionally, the HNDL modeler pinpoints and models HNDL threats, offering strategies to counteract these threats by identifying current and potential future attack vectors. Together, the data protection system provides an improved and technically advanced defense mechanism, reinforcing cryptographic safeguards, enhancing threat detection, and ensuring seamless and secure data migration amidst the evolving quantum threat landscape.

Although still in its infancy, quantum computing and its potential applications are of rapidly increasing interest to a broad array of industrial sectors, including simulation, artificial intelligence, healthcare, and financial services. Unlike classical computers, which process information in bits that can only represent one of two binary information states at a time, quantum computers process information in quantum bits (qubits) that can be in a superposition of all possible states at the same time. Further, two or more qubits may be entangled such that their quantum state cannot be described independently of each other, thus when two qubits are entangled the outcome of measurement of one qubit is always correlated with the measurement on the other qubit, even when the qubits are separated by large distances. Quantum computers may simultaneously perform a vast number of operations on the information stored in superposition. When measured, a qubit's probability to collapse into one state or the other is determined by the application of quantum phenomenon referred to as "interference". Superposition, entanglement, and interference are three phenomena in quantum mechanics that allow quantum computers to perform incredibly complex calculations at speeds and solve certain classes of problems that are beyond the capability of existing classical computers.

Reflecting this broad potential impact, governments and companies from a variety of market sectors are investing substantial resources to develop "noisy intermediate scale quantum" (NISQ) devices into large-scale fault-tolerant quantum computers. These NISQ devices are subject to rapid quantum decoherence and lack the quantum volume or other measurable metrics which may indicate that NISQ devices can convincingly outperform present-day classical computers.

Nonetheless, there is widespread agreement among experts that future quantum computers will disrupt current asymmetric algorithms and security protocols (e.g., TLS) that protect global financial markets and governmental institutions. Such quantum computers of the future are referred to as Cryptanalytically Relevant Quantum Computer (CRQC). For example, most common public-key cryptography schemes, such as the widely used Rivest-Shamir-Adleman (RSA), Diffie-Hellman (DH), and elliptic-curve Diffie-Hellman (ECDH) schemes, rely on the inability of classical computers to complete certain types of complex mathematical calculations, such as integer factorization and discrete logarithm computation, within a feasible amount of time. A quantum computer implementing Shor's algorithm will complete these complex calculations in a relatively short time and thereby determine the private keys from the corresponding public keys. Accordingly, there is an urgent need for data owners and hosting services to begin upgrading their systems to use quantum-resistant algorithms, known as PQC algorithms, before quantum computing capabilities are realized. However, the sheer volume of this data, the complexity of these systems, and further emergent difficulties with implementation present myriad challenges to any such migration plan.

Additionally, HNDL present a unique threat to entities wherein a bad actor may be surreptitiously hoarding encrypted data with the anticipation that future advancements in quantum computing will enable the decryption of this once-secure data that belonged to the entities. As quantum computing capabilities progress, the apparently secure data, particularly that encrypted with traditional cryptographic algorithms, could become accessible to malicious actors who have previously harvested it, thereby potentially exposing a trove of sensitive information. Understanding the intricacies of HNDL attacks requires a thorough approach that can simultaneously safeguard the data while anticipating future decryption capabilities. The incorporation of the PQC modeler and HNDL modeler addresses this by using a holistic approach to data security, not just focusing on immediate threats but also projecting future vulnerabilities. The two modelers not only select the optimal (or best) and secure post-quantum cryptographic algorithms but also models and predicts future decryption threats, crafting a defense strategy that is both short-term (immediate) and long-term.

Systems, apparatuses, methods, and non-transitory computer-readable media are disclosed herein for implementing a PQC modeler and an HNDL modeler, directed to enhancing cybersecurity frameworks to protect data against potential threats from quantum computing capabilities. This entails the design and deployment of systems that secure existing data, protocols, and networks from threat actors who exploit encrypted data, utilizing a unique architecture that anticipates quantum decryption capabilities. The PQC modeler serves not only as a facilitator for transitioning workflows within enterprises to utilize quantum-resistant cryptography, but also as an invaluable tool for gauging the impact of PQC algorithms and their respective implementations on organizational workflows. Together with the HNDL modeler, the systems and methods provide a symbiotic methodology where the PQC modeler and the HNDL modeler systematically work in unison, ensuring that output and actions from the PQC modeler are complete and thorough, while the HNDL modeler validates that all potential migrations have been identified and assessed. In some arrangements, a mapping system is capable of verifying and assigning an analysis to each workstream element influenced by an algorithm selected by the PQC modeler, thereby embedding an additional layer of security and verification in the data protection system and ensuring optimal and secure data migration in a post-quantum computational landscape.

The term "quantum computing device," "quantum computer," or "quantum device" is used to refer to a specialized computing device which stores and operates on information in quantum states. A quantum computer may make use of the quantum mechanical principles of superposition and entanglement to perform operations that are impossible on classical computers operating on classical information. Quantum computers include devices relying on technologies such as superconducting circuits, trapped ions, atoms in optical lattices, or any other of a wide array of technologies used to prepare and manipulate quantum states. Quantum computers may be gate-based, performing operations dictated by a quantum circuit, a series of operators, or logic gates that represent different transformations on the stored quantum states. A quantum computer may also be realized as a simulated system on a classical computer, though without the intrinsic speedup that a physical quantum computer provides through the use of superposition and entanglement.

The term "qubit" is used to refer to the fundamental unit of data on a quantum computer. A qubit may be initialized into a known quantum state, and the quantum state of the qubit may be manipulated by the quantum computer. The term "qubit may refer to a single system with two orthonormal basis states, typically designated 0 and 1, but the term qubit as used here may also include other schemes of representing quantum data such as a quantum trit (qutrit), quantum bit (qubit), or the like which employ a different set of basis states. A plurality of qubits may also form a set of qubits sometimes called a register that when considered together form product basis states that a quantum computer may act on. The term qubit as used here may also include schemes of storing quantum data from non-gate-based quantum computation systems such as adiabatic quantum computers The term "quantum circuit" is used to refer to a series of operators on a quantum state of a set of qubits comprising initializations, quantum gates, measurements, and other operations on qubits. A quantum circuit may be realized in various ways depending on the hardware implementation of the quantum computer on which it is executed. A quantum circuit may also be realized as a simulation of a quantum computer on another device.

The term "post-quantum cryptography (PQC) system," "post-quantum cryptography (PQC) data system," or "post-quantum cryptography (PQC) data storage" refers to cryptosystems which are designed to be resistant to quantum attacks. PQC systems will make use of specifically designed algorithms that are resistant to quantum attacks (PQC algorithms, defined below). The related term "cryptographic transition" refers to the updating from one system security architecture to another (e.g., using the PQC modeler 112). In some embodiments, cryptographic transition includes migration of legacy cryptographic systems to PQC systems.

The term "PQC algorithm" refers to a quantum-resistant cryptographic technique. The families of PQC cryptographic techniques include public-key exchange/key encapsulation algorithms, digital signature algorithms, and secure hashing algorithms. PQC algorithms may comprise, for example, hash-based PQC cryptographic techniques, lattice-based PQC cryptographic techniques, isogeny-based PQC cryptographic techniques, code-based PQC cryptographic techniques, multivariate-based PQC cryptographic techniques, zero-knowledge proof PQC cryptographic techniques, PQC communications channel-based cryptographic techniques, and other suitable techniques. In some instances, a PQC cryptographic technique may be a variant of a PQC cryptographic algorithm. For example, a first PQC cryptographic technique may be CRYSTALS-DILITHIUM2, a second PQC cryptographic technique may be CRYSTALS-DILITHIUM3, and a third PQC cryptographic technique may be CRYSTALS-DILITHIUM5, each of which is a variant of the same PQC cryptographic algorithm (e.g., CRYSTALS-DILITHIUM).

The term "workstream" refers to a particular use case that uses one or more PQC or non-PQC cryptographic algorithm. For example, a workstream relevant to a provider may be signing a loan application document, verifying the signature on a loan application document, encrypting a wire transfer, or downloading relevant cryptographic software. Workstreams (or tasks) may be grouped into a workstream set, a collection of workstreams that may be similar or belong to a common domain of activity. A workstream set usually maps to a function in an organization. For example, a general workstream set for generic tasks may be available, as well as a workstream set specific to document signing, allowing users to identify a workstream set relevant to their domain of PQC use cases. In each workstream, there can be a plurality of workstream elements. Each workstream elements can correspond with a plurality of data and/or characteristics of the data that is used or collected during the workstream. For example, for the workstream of withdrawing currency from an ATM, one workstream element could be verifying the debit card that was inserted into the ATM. In this example, the workstream element of verifying the debit card could include data such as, but not limited to, the life span that data is stored, the type of data received, the size of the data, a category, a National Institute of Standards and Technology (NIST) scenario, a payload usage, a host category, a cryptographic function, and so on.

The term "real-time" does not necessarily mean instantaneous, but rather refers to a process or system in which information is updated at a frequency that is suitable for its intended purpose, thereby enabling timely responses and decisions based on the most recent data available.

Referring now to FIG. 1, a block diagram depicting an example of a data protection system 110 in a computing environment 100 is shown, according to some arrangements. The computing environment 100 is shown to include a data protection system 110, data systems 140, 145, and 150, and data sources 160. The plurality of devices and/or systems 110, 140, 145, 150, and/or data sources 160 may initiate, collect, and/or route (e.g., provide) data over network 130. A data acquisition engine of the data protection system 110 may provide a single application programming interface (API) or multiple APIs to access various data generated, stored, or routed by devices and systems 110, 140, 145, 150, and/or 160.

Network 130 can include various wired and wireless connectivity options to facilitate the communication between different systems and devices such as the data protection system 110, data sources 160, and data systems 140, 145, and 150. Wired connections may be implemented through Ethernet, utilizing TCP/IP protocols to ensure accurate and reliable data packet transmission between the systems. Additionally, Wi-Fi or other radio frequency (RF) communication protocols can be utilized to allow for untethered interactions among the systems, also leveraging TCP/IP or UDP protocols as suited for particular data transmission and latency requirements. In all scenarios, the network 130 can prioritize secure and accurate data interchange among the diverse components in the interconnected computing environment 100.

In some arrangements, data system #1 (DS1) 140, data system #2 (DS2) 145, and data system #3 (DS3) 150 are data systems configured to execute various workstreams, each composed of multiple workstream elements. These data systems may manifest in different forms, such as physical servers, virtual machines, or embedded systems in various technological environments, each tailored to specific operational contexts. Each data system-DS1 140, DS2 145, and DS3 150—manages, processes, and stores data, ensuring the secure and efficient execution of workstreams across potentially diverse operational landscapes. The workstreams are structured sequences of operations or tasks, specified by the workstream elements, that guide the systems in accomplishing specific objectives, such as data processing, transaction management, cybersecurity, and network communications. The workstream elements within each workstream ensure functionality by acting as operational sub-units or procedural steps. They may interface with algorithms, protocols, or external modules to adapt to the specialized requirements of each data system, even though these systems operate under various contexts, such as different technological or security parameters.

In an example where DS1 140 is a company computer system, a workstream for processing a loan application could be executed. A workstream element such as "Loan App Sign" might include an employee entering, verifying, and digitally signing application data. Additional workstream elements could include tasks for data validation, credit checking, and automated communication with the applicant, each element ensuring secure handling and storage of sensitive data through specific security protocols. In another example, where DS2 145 is implemented as an ATM, workstream elements could be concentrated on user interaction and transactional security. A workstream for withdrawing money might include an "Access Token" workstream element to verify the user's identity and ensure secure communication with the bank's servers. Further workstream elements might facilitate processes such as account balance verification, cash dispensation, transaction receipt generation, and secure logging of transaction details, aligning user experience with secure and accurate transaction execution. In yet another example, where DS3 150 is used in server management, workstreams might focus on data backup and retrieval. A workstream element such as "Initiate Backup" could trigger data replication processes to secure, remote storage. Subsequent workstream elements could handle monitoring of the backup process, verification of data integrity post-backup, and generation and dispatch of process logs to administrators. Each element safeguards organizational data, providing a secure background operation, which is important in protecting against potential data loss and threats.

However, while DS1 140, DS2 145, and DS3 150 execute workstreams, the execution may be vulnerable to PQC and HNDL attacks. Accordingly, the data protection system 110 described herein can be configured to migrate the existing processes and execution of the data systems to a resilient cryptographic foundation that is resistant to both conventional and quantum computing threats, ensuring the safeguarding of data during both present and future cryptographic scenarios, while maintaining the integrity and functionality of the original workstreams and their constituent elements. This is accomplished by integrating post-quantum cryptographic algorithms and secure tactics, techniques, procedures, and mitigations, into the workstreams and workstream elements and establishing a fortified computational and communicative environment across all data systems, thereby mitigating potential vulnerabilities and safeguarding data and operations against prospective post-quantum cryptographic threats.

The one or more data sources 160 can be configured to provide pertinent data to the data protection system 110, aiding the PQC modeler 112 and HNDL modeler 114 in their respective analytical and modeling tasks by providing a range of relevant information, such as current cryptographic usage, system configurations, data flow, and existing cybersecurity threat mitigation strategies. The data may encompass specific details of existing cryptographic algorithms, data handling and storage procedures, security protocols, and detected or potential vulnerabilities within the workstreams and data systems (e.g., 140, 145, 150). Furthermore, data sources 160 could provide real-time or periodically updated information regarding emerging cybersecurity threats, novel cryptographic solutions, or alterations in data management practices, contributing to the adaptive and responsive functioning of the modeling and mapping mechanisms within the system. The integration of this data supports the continuous refinement and enhancement of the protection algorithms and threat response strategies developed by the PQC modeler 112 and HNDL modeler 114, respectively.

The data protection system 110 may include one or more systems (e.g., computer-readable instructions executable by a processor) and/or circuits (e.g., ASICs, Processor Memory combinations, logic circuits, etc.) configured to perform various functions of the data protection system 110. In some arrangements, the data protection system 110 may be or include a post-quantum cryptography (PQC) modeler 112, a harvest now decrypt later (HNDL) modeler 114, and a mapping system 116. It should be understood that various implementations may include more, fewer, or different systems than those illustrated in FIG. 1, and all such modifications are contemplated to be within the scope of the present disclosure. In general, the data protection system 110 is configured to counteract potential vulnerabilities and threats emerging from quantum computing capabilities, particularly those related to "harvest now, decrypt later" (HNDL) strategies. It consists of several components—the post-quantum cryptography (PQC) modeler 112, the HNDL modeler 114, and the mapping system 116—each of which contributes to providing data security against future quantum-based attacks and facilitating a secure migration from traditional cryptographic methods to quantum-resistant cryptographic workflows.

In some arrangements, the PQC modeler 112 can facilitate the transition to quantum-resistant cryptography by modeling the impact of various PQC algorithms (e.g., stored in algorithm dataset 122) on workflows and generating one or more changes. The PQC modeler 112 can be configured to perform algorithm selection. In some arrangements, the HNDL modeler 114 is configured to model potential threats by creating a cybersecurity matrix that encompasses a variety of threats, vulnerabilities, and risks, sometimes involving over 1000 entries. In particular, given the extended data shelf-life and the associated risk of future quantum computers decrypting currently secure asymmetric keys, modeling identifies threats and vulnerabilities in the future. The HNDL modeler 114 can analyze and strategize for data that might only be decrypted in the future, providing a layer of foresight and preparation. Additionally, the mapping system 116 can be configured to associate each algorithm selected by the PQC modeler 112 with a threat/vulnerability tactic, technique, and procedure identified by the HNDL modeler 114, providing a structured and strategically aligned approach to validate and verify the security protocols implemented. The mapping system 116 assures that the verification processes are systematic and aligned with the chosen algorithms and tests, ensuring the integrity of the implemented security protocols. Accordingly, the combined functionality of the PQC modeler 112 and HNDL modeler 114 provides an improved, validated approach to data protection by cross-verifying outputs and actions, while the mapping system 116 provides an improved, unified strategy in safeguarding data against potential future decryption threats posed by quantum computing.

In general, the PQC modeler 112 performs algorithmic modeling to determine suitable cryptographic algorithms for designated workstreams. The PQC modeler 112 adheres to defined parameters and computational logic, systematically evaluating diverse algorithms with an aim to safeguard against quantum computing threats. The PQC modeler 112 links cryptographic requirements with each respective workstream element, thereby outputting a data structure that intertwines workstreams with congruent PQC algorithms. This algorithmic selection, based on data-driven evaluations from algorithm dataset 122 and/or other data sources 160, forms a ciphered safeguard that is tailored to each unique workstream. Similarly, the HNDL modeler 114 executes modeling through an algorithmic process, identifying and categorizing cybersecurity threats within data systems and workstreams. The HNDL modeler 114 operations adhere to structured logic, analyzing the mechanics of data movement, storage, and handling within systems, and identifies potential vulnerabilities that could be targeted for data harvesting and future decryption. The HNDL modeler 114 outputs a structured, categorical mapping of the potential threats, vulnerabilities, and associated Tactics, Techniques, and Procedures (TTPs) by leveraging information from the response dataset 124 and/or additional data sources 160, thus providing a quantitative and analytical framework.

It should be understood that "modeling" with reference to PQC modeler 112 refers to the systematic selection and assignment of post-quantum cryptographic algorithms to different elements within workstreams, based on algorithmic logic and pre-defined parameters. It should also be understood that "modeling" with reference to HNDL modeler 114 refers to the algorithmic identification, analysis, and categorization of cybersecurity threats, vulnerabilities, and associated TTPs within data systems, adhering to quantitative analyses.

The PQC modeler 112 is configured to perform algorithm selection for workstream elements (WEs), ensuring that every workstream element within a workstream is accounted for in the migration path to utilizing quantum-resistant cryptography. This selection can be determined based on defined parameters and requirements. The PQC modeler 112 can utilize performance metrics (e.g., metrics stored in algorithm dataset 122) of PQC algorithms and their implementations to determine the impact on workflows. For example, the categories of algorithms can include, but are not limited to, key encapsulation mechanisms, digital signature algorithms, stateful hash-based signatures, and legacy algorithms, among others. Through analysis of the algorithm dataset 122, the PQC modeler 112 aims to identify appropriate algorithms that mitigate vulnerabilities and threats, adhering to predefined guidelines and matrices. The selection process accounts for the different properties of the algorithms, such as drop—in replacements, forward secrecy, misuse resistance during integration, and implementation simplicity. Furthermore, for any given set of criteria, the PQC modeler 112 provides responses with tuples, each containing a PQC algorithm and a legacy algorithm, along with a set of parameters for each algorithm. In some embodiments, the algorithm selection of workstreams using the PQC modeler 112 is described in greater detail in U.S. application Ser. No. 18/047,900, filed Oct. 19, 2022, the entire disclosure of which is incorporated by reference herein. It should be understood that each workstream of U.S. application Ser. No. 18/047,900 (e.g., shown in workstream information panel 410 of FIG. 4) can include workstream elements, for example, Name, Life Span (yrs.), Type, Size (KB), Category, NIST Scenario, Payload Usage, Host Category, Cryptographic Function, etc.

The HNDL modeler 114 is configured to model multiple workstreams, data systems (e.g., 140, 145, 150), frameworks, threat models, and matrices to identify one or more cybersecurity threats. The HNDL modeler 114 can analyze the structural and procedural aspects of workstreams and examine the configurations, data flows, and potential vulnerabilities in the data systems and within various cybersecurity frameworks and models (e.g., those stored in response dataset 124 or in data sources 160), to discern where data might be harvested by malicious actors for future decryption-particularly relevant when future computational capabilities (such as those provided by quantum computing) may render current cryptographic safeguards ineffective. Beyond workstreams, the HNDL modeler 114 dissects the attributes and interplay between various elements within the data systems, frameworks, threat models, and matrices, enabling a thorough understanding of data management, transfer, storage, and potential vulnerability points across the analyzed domains, ensuring a multi-faceted, in-depth analysis of points susceptible to data interception and subsequent decryption.

In addition, the HNDL modeler 114 establishes and utilizes structured matrices-like the TTP (Tactics, Techniques, and Procedures) matrix—to systematically categorize, define, and analyze potential threat vectors, vulnerabilities, and mitigation strategies across all analyzed entities including workstreams, data systems, and frameworks. The HNDL modeler 114 does not limit its analysis to workstream elements but extends its categorical tactics, techniques, and procedures (TTPs) identification and mapping across different cybersecurity threats found within the various systems, models, and matrices it evaluates. The categorization and analysis employ a structured framework that assist in deciphering potential exploits not only within workstreams but also throughout the entirety of the assessed cybersecurity infrastructures and models, hence ensuring a broad and strategic response or mitigation planning and application across all analyzed entities.

The mapping system 116 is configured to correlate and align data from the PQC modeler 112 and HNDL modeler 114 to establish potential mappings between them. It can use various methods, such as a distance model, which considers the cryptographic distance or difference between data points, or employ clustering techniques, which group similar data to establish these mappings. The mapping system 116 analyzes the cryptographic properties of data from both modelers (e.g., outputs of PQC modeler 112 and HNDL modeler 114), identifying commonalities and differences and targeting to align PQC data and TTP data, based on the cryptographic similarities or relevance which can be formulated from the structured, grouped data produced by the modelers.

In a more detailed operation, the mapping system 116 assists in establishing cryptographic congruence between the data points, leading to mapped relationships that are critically relevant in practical scenarios. If the mapping reveals discrepancies, such as a cell in the TTP matrix from HNDL modeler 114 not having a corresponding cryptographic solution in the PQC modeler 112 output, the mapping system 116 can facilitate a recalibration or update of the data structure. This ensures that each identified threat, vulnerability, or procedure has a mapped cryptographic counterpart, providing a comprehensive, intertwined cybersecurity infrastructure where identified threats have corresponding cryptographic mitigation tactics, thus reducing the threat vector surface effectively.

In some arrangements, the data protection database 120 can maintain two subsets of data: the algorithm dataset 122 and the response dataset 124. The algorithm dataset 122 stores various protection algorithms, their respective computational properties, and applicable use-cases in a structured format, enabling efficient retrieval and utilization by the PQC modeler 112. This data subset aids in the selection and application of relevant algorithms, as the PQC modeler 112 references it to determine which algorithms to apply based on specific workstream elements and other evaluation criteria. The response dataset 124 can include a structured format (e.g., generated by HNDL modeler 114) which categorizes and outlines known cyber threat TTPs and correlated mitigation strategies. This subset acts as a reference for the HNDL modeler 114 and the mapping system 116, providing a database from which to draw connections between identified cybersecurity threats and established mitigation strategies. As such, the data protection database 120 provides a structured, accessible foundation for the data protection system 110 to identify, select, and apply protection algorithms and threat mitigation strategies across varied workstreams and data systems (e.g., 140, 145, and 150).

In some arrangements, the PQC modeler 112 employs the algorithm dataset 122 and can leverage additional information from data sources 160 to determine and implement post-quantum cryptographic algorithms across different workstream elements on various data systems. Within the algorithm dataset 122, the PQC modeler 112 accesses cryptographic algorithms, each annotated with associated computational attributes and use-case scenarios, which facilitate the modeler's function of selecting appropriate encryption or protection methods. While interacting with the workstream elements, the PQC modeler 112 extracts attributes like data type, size, and associated cryptographic needs and cross-references these attributes with the algorithm dataset 122.

In some arrangements, the HNDL modeler 114, utilizing the response dataset 124, can interface with data sources 160, identify potential cybersecurity threats, and generate applicable mitigation strategies in a structured manner. By referencing the response dataset 124, which may embody a matrix outlining threat tactics, techniques, and procedures (TTPs) alongside correlative mitigation approaches, the HNDL modeler 114 identifies and organizes the potential cybersecurity threats pertinent to workstreams and data systems under scrutiny. Employing this structured data, the HNDL modeler 114 is equipped to recognize vulnerabilities and threat vectors, and accordingly map the identified threats to the coherent mitigation strategies, thereby furnishing a structured architecture for reducing the potential exploitation of vulnerabilities and securing the workstreams and data systems against the anticipated cybersecurity threats.

The data protection database 120 functions as a centralized repository storing datasets for the operation of both the PQC modeler 112 and the HNDL modeler 114, specifically including the algorithm dataset 122 and the response dataset 124. The algorithm dataset 122 encapsulates a collection of cryptographic algorithms, including their computational attributes, performance metrics, and applicability to various data types and sizes, providing a referenceable library for selecting and implementing cryptography across different workstreams and data systems. Concurrently, the response dataset 124 consists of structured data matrices or frameworks which catalog cybersecurity threat tactics, techniques, and procedures (TTPs) and align them with corresponding mitigation strategies, providing a structured methodology for identifying, categorizing, and addressing cybersecurity threats.

Figure 2:
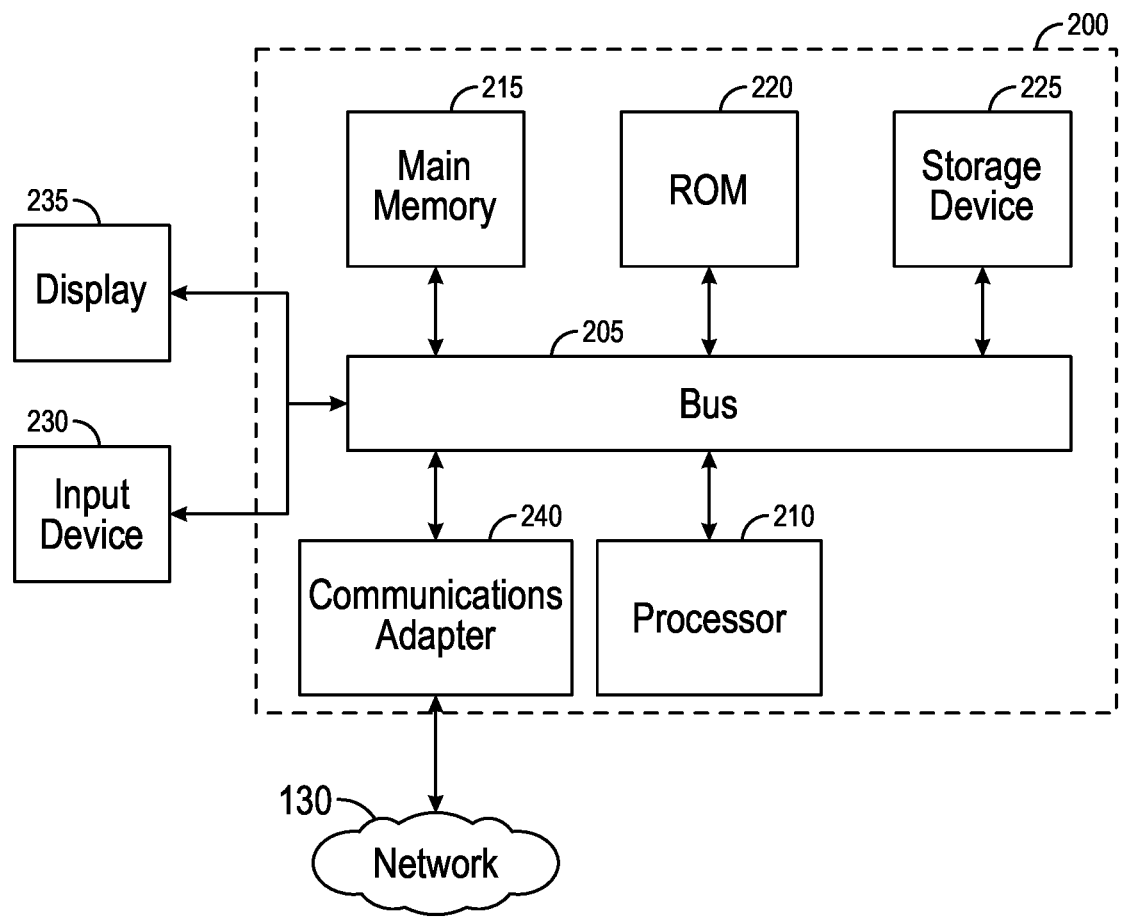
FIG. 2 is a block diagram illustrating an example computing system suitable for use in the various arrangements described herein.

Referring now to FIG. 2, a depiction of a computer system 200 is shown. The computer system 200 can be used, for example, to implement a computing environment 100, data protection system 110, data systems 140, 145, and 150, data sources 160, and/or various other example systems described in the present disclosure. The computing system 200 includes a bus 205 or other communication component for communicating information and a processor 210 coupled to the bus 205 for processing information. The computing system 200 also includes main memory 215, such as a random-access memory (RAM) or other dynamic storage device, coupled to the bus 205 for storing information, and instructions to be executed by the processor 210. Main memory 215 can also be used for storing position information, temporary variables, or other intermediate information during execution of instructions by the processor 210. The computing system 200 may further include a read only memory (ROM) 220 or other static storage device coupled to the bus 205 for storing static information and instructions for the processor 210. A storage device 225, such as a solid-state device, magnetic disk or optical disk, is coupled to the bus 205 for persistently storing information and instructions.

The computing system 200 may be coupled via the bus 205 to a display 235, such as a liquid crystal display or active matrix display, for displaying information to a user. An input device 230, such as a keyboard including alphanumeric and other keys, may be coupled to the bus 205 for communicating information and command selections to the processor 210. In another arrangement, the input device 230 has a touch screen display 235. The input device 230 can include any type of biometric sensor, a cursor control, such as a mouse, a trackball, or cursor direction keys for communicating direction information and command selections to the processor 210 and for controlling cursor movement on the display 235.

In some arrangements, the computing system 200 may include a communications adapter 240, such as a networking adapter. Communications adapter 240 may be coupled to bus 205 and may be configured to enable communications with a computing or communications network 130 and/or other computing systems. In various illustrative arrangements, any type of networking configuration may be achieved using communications adapter 240, such as wired (e.g., via Ethernet), wireless (e.g., via Wi-Fi, Bluetooth), satellite (e.g., via GPS) pre-configured, ad-hoc, LAN, or WAN.

According to various arrangements, the processes that effectuate illustrative arrangements described herein can be achieved by the computing system 200 in response to the processor 210 executing an arrangement of instructions contained in main memory 215. Such instructions can be read into main memory 215 from another computer-readable medium, such as the storage device 225. Execution of the arrangement of instructions contained in main memory 215 causes the computing system 200 to perform the illustrative processes described herein. One or more processors in a multi-processing arrangement may also be employed to execute the instructions contained in main memory 215. In alternative arrangements, hard-wired circuitry may be used in place of or in combination with software instructions to implement illustrative arrangements. Thus, arrangements are not limited to any specific combination of hardware circuitry and software.

That is, although an example processing system has been described in FIG. 2, arrangements of the subject matter and the functional operations described in this specification can be carried out using other types of digital electronic circuitry, or in computer software (e.g., application, blockchain, distributed ledger application, cryptography application) embodied on a tangible medium, firmware, or hardware, including the structures disclosed in this specification and their structural equivalents, or in combinations of one or more of them. Arrangements of the subject matter described in this specification can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

Although shown in the arrangements of FIG. 2 as singular, stand-alone devices, one of ordinary skill in the art will appreciate that, in some arrangements, the computing system 200 may comprise virtualized systems and/or system resources. For example, in some arrangements, the computing system 200 may be a virtual switch, virtual router, virtual host, or virtual server. In various arrangements, computing system 200 may share physical storage, hardware, and other resources with other virtual machines. In some arrangements, virtual resources of the network 130 (e.g., network 130 of FIG. 1) may include cloud computing resources such that a virtual resource may rely on distributed processing across more than one physical processor, distributed memory, etc.

Figure 3A:
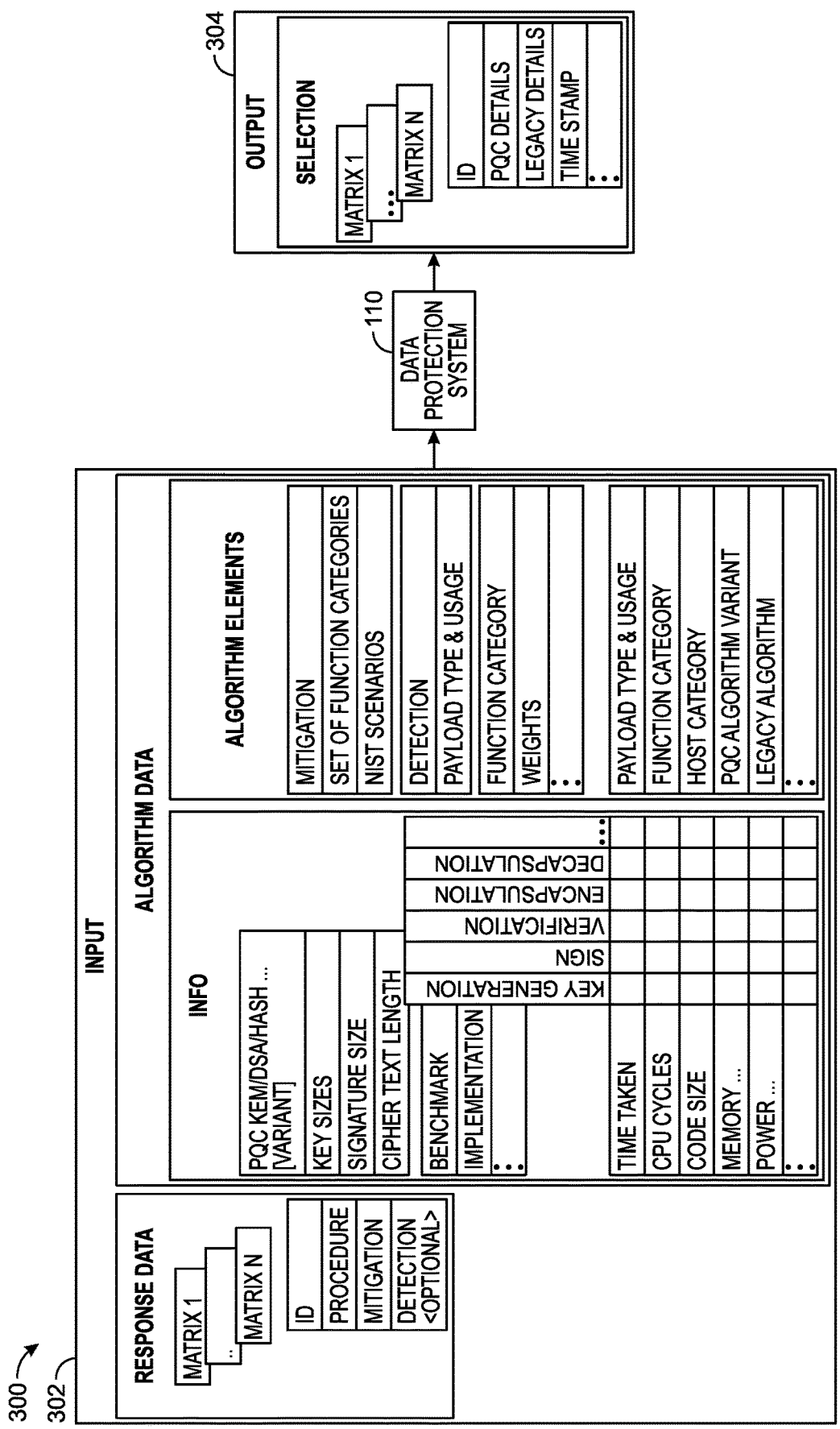
FIGS. 3A-3C are example illustrations of the data protection architecture, according to some arrangements.

Referring now to FIG. 3A, depicting a component of the data protection system 110, specifically detailing a process 300 illustrating the functionality of the PQC modeler 112. The input 302 (e.g., structured as a tuple) can contain algorithm data and response data related to various techniques, procedures, mitigation strategies, and detection mechanisms. In some arrangements, the input data consists of details about response and algorithm data. Response data can include, but is not limited to, information regarding techniques, procedures, mitigation, and detection. Algorithm data can provide information about the PQC algorithm. This PQC algorithm information may include PQC KEM/DSA/HASH, key sizes, signature size, cipher text length, benchmark data, and implementation details relevant to PQC algorithms. Moreover, PQC algorithm information can include metrics such as time taken, CPU cycles, code size, memory usage, and power consumption. In some arrangements, additional algorithm data includes information about algorithm elements (i.e., workstream elements) involving mitigation, sets of function categories, NIST scenarios, detection mechanisms, payload type and usage, function category, weights, host category, PQC algorithm variants, and legacy algorithms.

It should be understood that the algorithm elements mentioned in the context of FIG. 3A directly correlate to the workstream elements (WEs) described previously. In particular, each algorithm element represents a discrete unit or component within the broader workstream, dictating the specific cryptographic actions or behaviors that need to be executed within that segment of the process. When the PQC modeler 112 processes the input data, it analyzes these algorithm elements, evaluating and selecting suitable PQC algorithms and parameters that align with the characteristic requirements and constraints of each respective algorithm element (i.e., workstream element). Thus, the entire workstream, constituted by a series of these algorithm elements, is systematically analyzed, and an optimal migration path towards implementing quantum-resistant cryptography is formulated, ensuring each component of the workflow is duly considered and addressed in the resultant output.

In some arrangements, the PQC modeler 112 analyzes the input data and generates an output 304, structured as a series of tuples. Every tuple within the output encapsulates details pertaining to a selected PQC algorithm and a legacy algorithm, accompanied by specific parameters for each. These parameters, which may encompass aspects such as an ID, PQC details, legacy details, and a timestamp, are inherently tied to individual workstream elements, ensuring that each algorithmic selection and its associated parameters are directly relevant and applicable to the respective operational, security, and performance contexts of each element within the workstream. The process 300 and functionality (FIG. 3A) illustrate a systematic and structured approach by the PQC modeler 112 (within the data protection system 110) to process detailed input 302 (i.e., input data) and to generate output 304 that combines details of both PQC and legacy algorithms with their respective parameters. This approach ensures that the output algorithm details align with the informational and computational requirements of the data systems 140, 145, and/or 150.

In general, the PQC modeler 112 is configured to define a series of parameters for each of the protection algorithms and output tuples, with each tuple containing a protection algorithm and its corresponding legacy algorithm. This approach establishes a structured relationship between advanced cryptographic protections and existing cryptographic algorithms, enabling a transition path between them. Further, the PQC modeler 112 employs machine learning (ML) or artificial intelligence (AI) algorithms to map and correlate protection algorithms with their corresponding workstream elements. This usage of ML or AI is grounded in a predefined and periodically updated database that details algorithmic performance metrics and resource requirements for various data systems. This ensures the chosen cryptographic protection algorithms are appropriate for each workstream element, balancing security needs with resource availability and optimizing for changing cybersecurity threats and computational capabilities.

Additionally, while FIG. 3A delineates the input as a structured tuple, the PQC modeler 112 is adaptable to various input and output formats to ensure versatility in handling different data structures and use cases. For instance, the input could be presented as a JSON object, an XML file, or a simple comma-separated value (CSV) file, accommodating different contexts and source systems. Similarly, the output is not limited to a list of tuples. Alternative output formats might include a dictionary with key-value pairs, a structured JSON object, or a binary data format to suit specific requirements of target systems or applications. This flexibility in accepting diverse input and output formats allows the PQC modeler 112 to interface seamlessly with various systems, ensuring the compatibility and interoperability of the data protection system 110 across disparate technological environments.

Figure 3B:
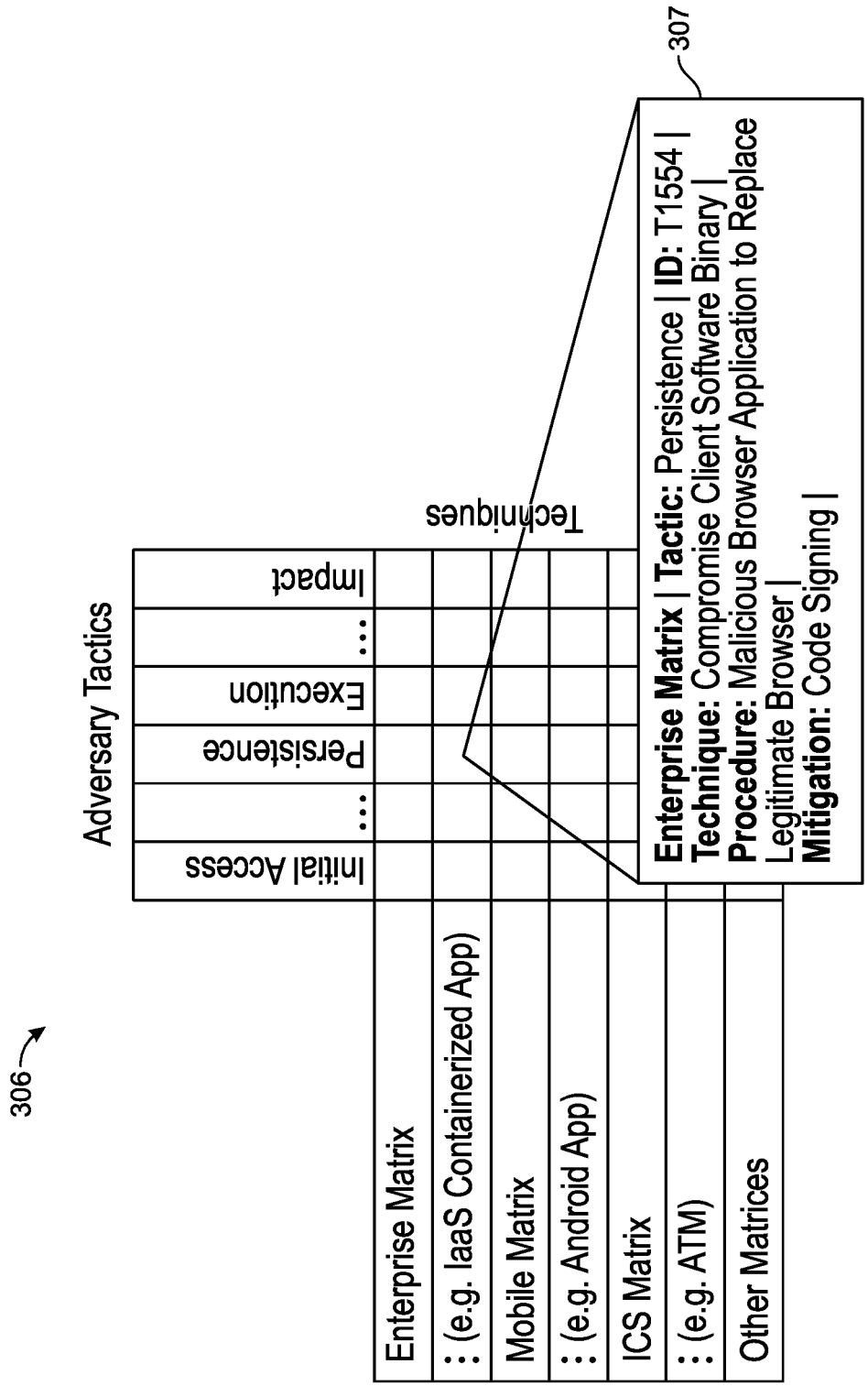

Referring now to FIG. 3B, depicting a component of the data protection system 110, specifically detailing an output 306 (i.e., matrix of threats, vulnerabilities and risks) illustrating the functionality of the HNDL modeler 114. The depiction provides insight into a distinct cell 307 within a matrix, which includes a large number of entries and is designed to categorize various hierarchies, such as those pertaining to different technological infrastructures and mobile platforms, among others. Every cell within a specified hierarchy, such as an enterprise-related matrix, can correspond to unique adversary tactics and is associated with a specific technique, procedure, and mitigation strategy, thus ensuring a consistent structural approach across all cells in a cyberattack matrix.

In a provided example, a technique from a representative "Enterprise Matrix" serves to illustrate the concept, employing a combination of both predefined and custom data objects and using a standardized communication protocol to facilitate data exchange and communication. This approach improves potential future integrations with additional vulnerability databases and provides a streamlined, organized method of managing and mitigating cybersecurity threats across a variety of technological domains and infrastructures. The matrix, prepared by the HNDL modeler 114, can be a proprietary data format, highlighting a structured and systematic methodology to addressing cybersecurity threats across various matrices.

In the depicted output 306, which takes the form of a matrix, an example cell 307 is shown within the enterprise matrix section. In some embodiments, an Enterprise Matrix can be a set of tactics and techniques to represent MITRE ATT&CK® for Enterprise covering techniques. The Enterprise Matrix for cloud-based techniques is known as IaaS Matrix or IaaS Containerized App. As in many Matrices, each column can represent a set of tactics, whereas the row can represent a technique. In such a matrix, each cell conveys detailed information regarding a cybersecurity tactic, technique, procedure, and mitigation strategy as follows: Tactic is defined as "Persistence"; it is assigned an ID of "T1554"; the Technique employed is "Compromise Client Software Binary"; the Procedure involves utilizing a "Malicious Browser Application to Replace Legitimate Browser"; and the Mitigation strategy prescribed is "Code Signing."

Figure 3C:
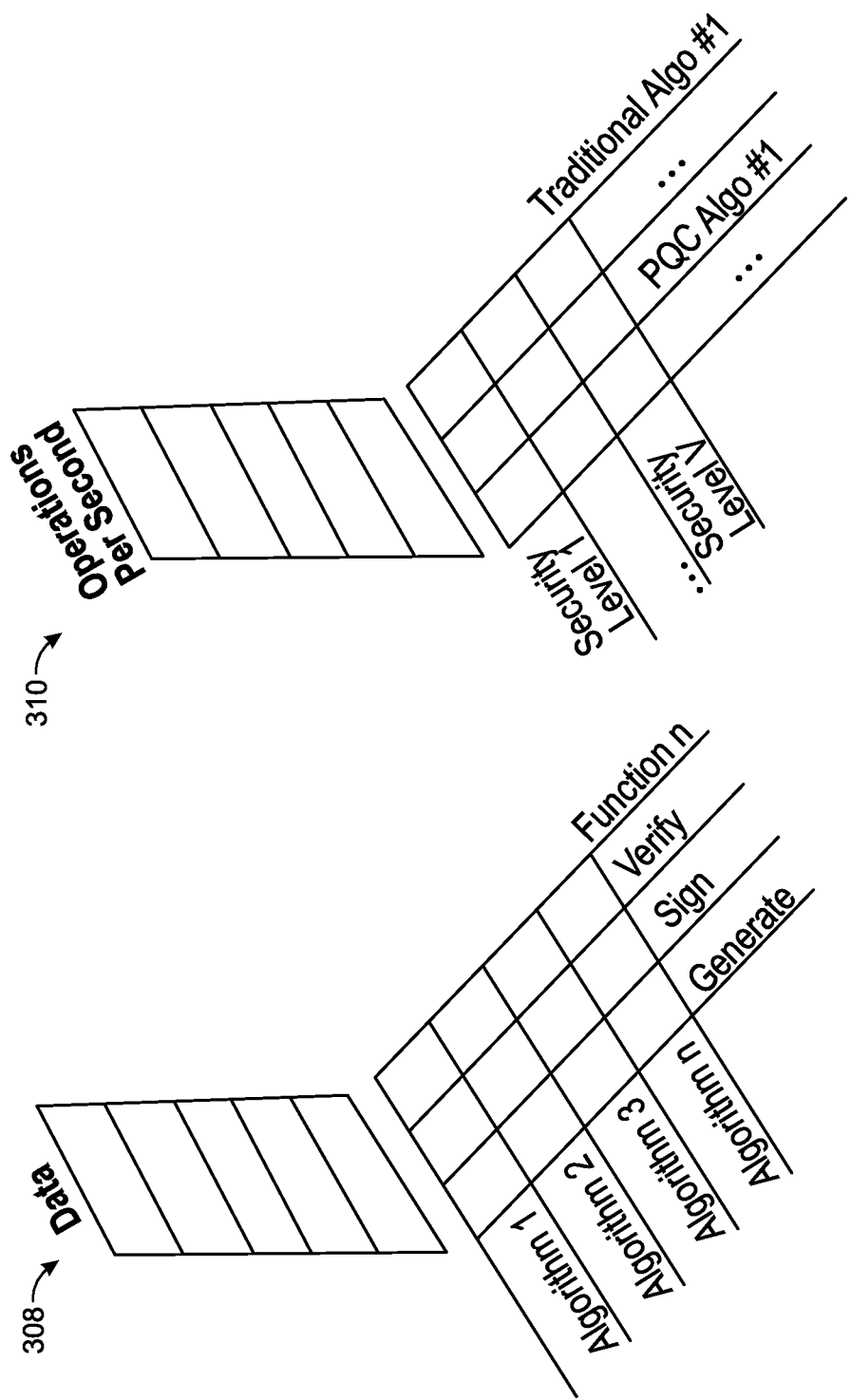

Referring now to FIG. 3C, depicting a component of data protection system 110, specifically, optionally providing a visualization, through outputs 308 and 310, which illustrates the functionality of PQC modeler 112 in the context of various workstream elements. Output 308 is a data matrix, serving distinct workstream elements by delineating information about numerous cryptographic algorithms along the vertical axis (or rows), such as Algorithm 1, Algorithm 2, and so on, up to Algorithm N. Across the horizontal axis (or columns), different functional aspects are illustrated, generically referred to as "function n," and examples include "verify," "sign," and "generate". Each cell of the matrix, formed by the intersection of an algorithm and a functional aspect, encapsulates specific data that conveys how a particular algorithm performs across several functional dimensions. This data can be specific to each workstream element, ensuring the relevant algorithmic functionality and performance information is made available in relation to specific workstream scenarios and requirements.

Similarly, output 310 provides another matrix representation but includes data regarding operations per second for different algorithms across various security levels, also contextualized for each workstream element. Here, the vertical axis represents different security levels, for example, labeled as Security Level 1 (or I) through to Security Level V, while the horizontal axis manifests different algorithms, which could include both traditional and post-quantum examples, like Traditional Algorithm #1, PQC Algorithm #1, etc. Each matrix cell communicates the operations per second metric for an algorithm at a designated security level, tailored to the specific needs and contexts of the workstream element in question.

Accordingly, outputs 308 and 310 provide structured and visually understandable insights regarding the performance and functionality of an array of algorithms, contextualized across various functional aspects and security levels for each workstream element. This arrangement aids the data protection system 110 and system users in extracting relevant data, facilitating informed decision-making related to algorithm selection and implementation in distinct workstream contexts.

Figure 4:
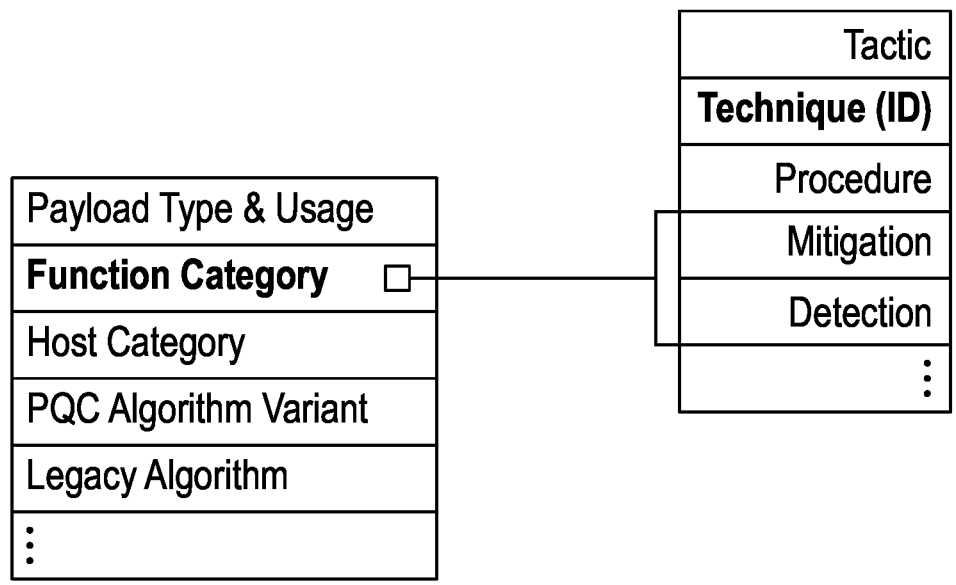
FIG. 4 is an example illustration of a data mapping architecture, according to some arrangements.

Referring now to FIG. 4, depicting an example data mapping 400 scenario between a PQC algorithm and a cybersecurity vulnerability matrix (i.e., cybersecurity threats), providing that specific aspects of the PQC algorithm are appropriately correlated to the mitigation and detection strategies highlighted within the matrix. The depicted data mapping 400 enables an alignment between the attributes and categories of a PQC algorithm with the broad, comprehensive data contained within the cybersecurity matrix, ensuring a thorough examination and implementation of cybersecurity strategies. In this depicted data mapping 400, the function category of the PQC algorithm is mapped to respective mitigation and detection entries within the cybersecurity matrix. This data mapping 400 allows for an understanding of how specific PQC algorithms can be employed to navigate, mitigate, and detect potential cybersecurity vulnerabilities. The process also enables cybersecurity systems and professionals to leverage the multifaceted data within the matrix to enhance the application and efficiency of PQC algorithms in real-world scenarios. Addressing the enormity and complexity of the vulnerability database, such as the cybersecurity matrix, which contains multifaceted data far too substantial to be effectively parsed and comprehended by individuals, demands a systematic, computational approach. Particularly when aligning this with the PQC algorithm, the challenge magnifies, given the increasing and perhaps non-linear, potentially exponential growth rate of inputs and data points to be analyzed and correlated.

In some arrangements, the data mapping illustrated in FIG. 4 can be perceived as a data fusion scenario. The two datasets, one derived from a modeler like HNDL modeler 114 and the other from a PQC modeler 112, contain data that can be described using partially shared features due to their foundational build upon the same cryptographic primitives. By identifying these shared features and constructing a mapping that aligns analogous or related data points between the datasets, a coherent and structured mapping or linkage is established. This linkage not only enhances the applicability and relevancy of the PQC algorithm in cybersecurity contexts but also enriches the cybersecurity vulnerability matrix with the additional context and possibilities introduced by PQC algorithms, enabling a symbiotic relationship and mutual enhancement between the two domains.

Figure 5:
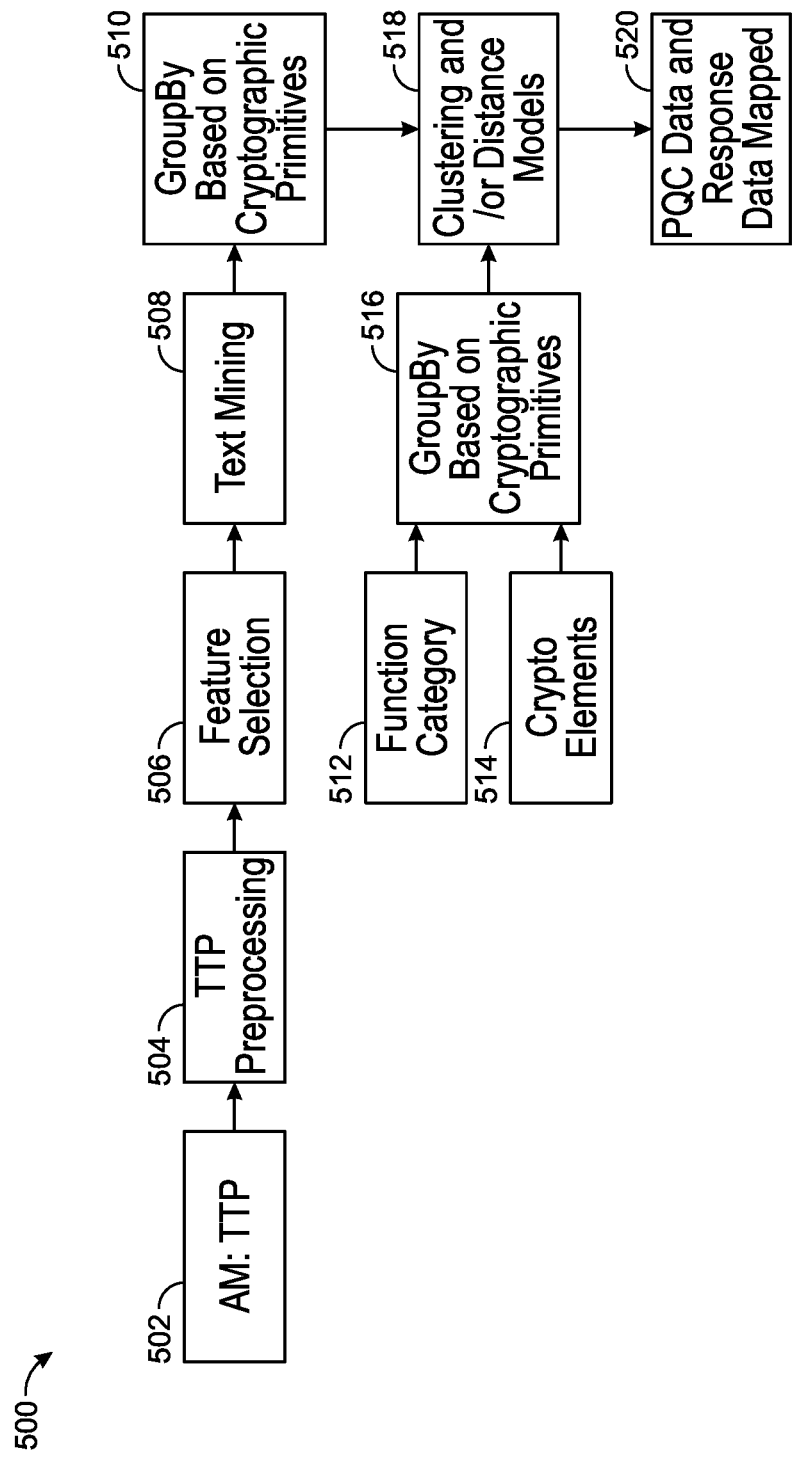
FIG. 5 is an example process illustrating data mapping, according to some arrangements.

Referring now to FIG. 5, depicting an example workflow, illustrating a method 500 for mapping data between cybersecurity vulnerability matrices and PQC algorithm data through a structured two-step process. In general, the mapping system 116 receives an attack matrix (AM) of Tactics, Techniques, and Procedures (TTP) at block 502 from the HNDL modeler 114. Subsequent blocks (504-510) include processing this TTP data, selecting relevant features, mining textual information, and grouping data based on cryptographic primitives. In parallel, a function category and cryptographic algorithm workstream elements (i.e., cryptographic elements) are received at blocks 512 and 514 from PQC modeler 112, respectively, and are also grouped by cryptographic primitives at block 516. Blocks 516 and 510 channel into block 518, where clustering and/or distance models establish mappings based on shared cryptographic elements. Finally, block 520 outputs the mapped data, intertwining PQC and cybersecurity vulnerability matrix data. This method provides a precise, structured manner for correlating data points, utilizing machine learning models and pre-mapped data to learn relationships and create a mapping, while also considering risks like data poisoning, which may require further investigation to safeguard the integrity of the mapping process.

In the depicted workflow of method 500 in FIG. 5, the stage including blocks 504, 506, and 508 takes the received matrix data (i.e., cybersecurity threats of the one or more data systems 140, 145, and 150) and subjects it to a series of transformative processes to prepare it for subsequent analysis and mapping. In some arrangements, at block 504, TTP Processing provides a handling of Tactics, Techniques, and Procedures (TTP) data, where the data is normalized, any inconsistencies or anomalies are addressed, and possibly reformatted into a structure that is optimal for subsequent analytical steps. This is particularly important for ensuring that the TTP data, which forms the foundation of the mapping process, is coherent, consistent, and primed for further processing.

In some arrangements, following this, block 506 introduces feature selection, a phase wherein the most pertinent and informative attributes of the TTP data are identified and isolated. This includes potentially leveraging statistical methods, domain expertise, and automated algorithms to determine which features of the TTP data are most crucial and informative for the mapping process. A discerning selection of features not only enhances the performance of subsequent modeling activities but also ensures that the most relevant aspects of the data are brought into focus for the subsequent text mining (TM) stage.

In some arrangements following this, at block 508, TM is executed on the selected features, often incorporating techniques such as Natural Language Processing (NLP), keyword extraction, and thematic modeling to glean valuable insights and additional features from textual data. This step transforms textual content into numerical data, isolates keywords or phrases indicative of attack types or vulnerabilities, and potentially categorizes the textual data into relevant themes, which is used in the subsequent grouping of data based on cryptographic primitives in block 510. Collectively, steps 504-508 merge to ensure that the TTP data is thoroughly processed and critical features are isolated. Additionally, steps 504-508 ensure that any textual content is mined to extract insights that inform the latter stages of method 500. The resultant mapped output is presented in block 520 (also illustrated in FIG. 6).

In FIG. 5, the series of steps executed by mapping system 116, concluding at blocks 510 and 516 guide the data through a structured pathway within the mapping system 116, providing management and utilization of the incoming data sets from both the PQC modeler 112 HNDL modeler 114. Block 510 includes grouping data by cryptographic primitives, where data emerging from the previous TM stage (block 508) is categorized based on common cryptographic foundations. In particular, this step organizes the processed TTP data into logical clusters based on shared cryptographic characteristics. Simultaneously (or in parallel or sequentially), mapping system 116 at block 516 similarly directs the treatment of function categories and workstream elements, which are similarly grouped by cryptographic primitives. Here, the data pertinent to PQC algorithms and associated parameters is organized into discernible clusters according to their cryptographic underpinnings, establishing a structured format that mirrors the organization of the TTP data from block 510. This parallel treatment and organization of the two diverse data sets establish a structured foundation upon which subsequent mapping can be more effectively implemented.

In general, at block 518, the mapping system 116 conducts a process to map workstream elements, including PQC data and related algorithms, to cybersecurity threats, which are referred to as TTP data. This mapping is based on correlations between protection algorithms and cybersecurity threats. Specifically, a cryptographic protection migration uses one or more alignment techniques (e.g., clustering modeling techniques, distance modeling techniques, other heuristics) to align protection algorithms, as determined by the PQC modeler 112, with cybersecurity threats, as modeled by the HNDL modeler 114. The goal is to generate a mapping that minimizes the threat vector surface. This method establishes a linkage between cryptographic algorithms and cybersecurity threats, aiming to optimize the alignment of cryptographic capabilities against potential threat vectors and ensure security implementations effectively counter anticipated threats, providing a practical and adaptive cryptographic application.

In some embodiments, cluster modeling techniques, as referred to in block 518, are analytical tools that segment a data set into distinct groups or clusters based on shared properties or characteristics. By using clustering algorithms like K-means, hierarchical clustering, or DBSCAN, the mapping system 116 can categorize TTP data and PQC data into cryptographically coherent clusters. In doing so, the mapping system 116 identifies underlying patterns and relations in the data, such as similarities in encryption mechanisms or cryptographic strength. For example, AES and DES encryption methods might be clustered together as symmetric encryption methods, while RSA and ECC may be clustered as asymmetric cryptographic algorithms. In some embodiments, distance modeling techniques are directed to measuring the distance or dissimilarity between data points. Using methods like Euclidean distance, Manhattan distance, or cosine similarity, these techniques allow the mapping system 116 to determine how closely related two cryptographic entities might be. For example, comparing the strength of two cryptographic algorithms can be achieved by measuring the distance between their respective key lengths or the time taken for encryption/decryption.

Additionally, other alignment techniques can provide methods and frameworks to align data points or features from one set with another, ensuring that the correlation is meaningful and applicable. For example, a linear alignment technique might be used to align the encryption strength of a PQC algorithm with the potency of a specific cybersecurity threat. Another example might be a dynamic time warping alignment that matches patterns in temporal data, like analyzing patterns in network traffic against known malicious attack sequences. Through these alignment techniques, the mapping system 116 ensures that the correlated PQC and cybersecurity threat data provides actionable insights to safeguard systems effectively and improve data security in underlying susceptible data.

In some arrangements, mapping system 116 at block 518 might execute clustering or utilize a distance model to engage with the grouped data from blocks 510 and 516, where the objective is to map one or more workstream elements of the workstream into one or more cybersecurity threats. Employing mathematical or algorithmic models, the mapping system 116 can analyze structured, grouped data from blocks 510 and 516, assessing their cryptographic similarities and differences. The specific undertaking of the distance model is to gauge the cryptographic 'distance' or distinction between data points, using this metric to identify potential mappings and relationships between PQC data, which encompasses details from the workstream elements, and TTP data based on cryptographic coherence. This mapping is navigated by correlating one or more protection algorithms and the one or more cybersecurity threats. Here, the correlations embody a cryptographic protection migration that employs one or more alignment techniques (i.e., to optimize the alignment) to align the protection algorithms, as identified by the first modeler, with the cybersecurity threats, as conceptualized by the second modeler. The resultant mapping aims to curtail a threat vector surface.

Alternatively or combinatorially, the mapping system 116 might utilize a similarity-based approach, where algorithms are employed to identify identical or nearly identical cryptographic characteristics among data from blocks 510 and 516, emphasizing direct similarity over conceptual or cryptographic proximity. Another potential method involves implementing a categorical mapping approach, where algorithms from both data sets that fall into predefined cryptographic categories are automatically mapped to each other, reducing the complexity and computational demand of the mapping process by bypassing the need to assess and compare individual cryptographic properties.

It should be understood that a threat vector surface refers to the collection of all possible avenues or pathways through which cybersecurity threats or attackers can gain unauthorized access to a system, network, or data. This surface encompasses various vectors, including but not limited to, email attachments, web pages, pop-up windows, chat messages, and system interfaces, each providing potential gateways for cyberattacks or breaches to manifest. Managing and reducing the threat vector surface involves identifying, evaluating, and mitigating these potential entry points, thereby reducing the opportunities for unauthorized access and securing the computational environment against potential cybersecurity threats. In the context of reducing a threat vector surface through mapping, consider that each algorithm within the post-quantum cryptography (PQC) data and traditional cryptographic strategies is designed to protect specific aspects or vectors of a system. For instance, a PQC algorithm might be particularly adept at securing data during transmission between systems (a vector), while a legacy algorithm may offer robust defense against breaches of stored data (another vector). When mapping is executed, particularly between PQC algorithms (and related workstream elements) and Threat Tactics, Techniques, and Procedures (TTP) data, it establishes correlations and equivalences between cryptographic strategies and potential cyber threats. For example, if a specific cyber threat—e.g., a novel malware type identified in the TTP data—is known to exploit vulnerabilities during data transmission, the mapping process might identify and align this threat with a PQC algorithm designed to safeguard data in transit. Here, the PQC algorithm acts to shield the data transmission vector, mitigating the threat posed by the malware. Similarly, if a legacy algorithm is proven to be susceptible to a specific attack tactic, the mapping could facilitate replacing or augmenting it with a PQC algorithm that offers enhanced protection against that tactic, thereby reducing the vulnerability in that particular vector. By achieving such specific, targeted mappings between cryptographic protections and threat tactics, the data protection system 110 minimizes vulnerabilities across its operational vectors, which in turn reduces the overall threat vector surface, making it an improved, secure and robust environment against potential cyberattacks and threats.

In some arrangements, the mapping system 116 at block 520 can output the mapped data, which reflects the established relationships between PQC data and the attack matrix data, driven by their cryptographic parallels. The mapping is shown in greater detail with reference to FIG. 6. This output, produced by the mapping system 116, serves as a representation of the PQC algorithm data (including workstream elements) and response data (i.e., TTP data such as matrices), constructed through a structured and cryptography-driven mapping process. This output can represent a mapping of data from both sources but also provides a structured and applicable resource from which subsequent analysis, decision-making, and strategic planning can be conducted within the broader data protection system 110.

Figure 6:
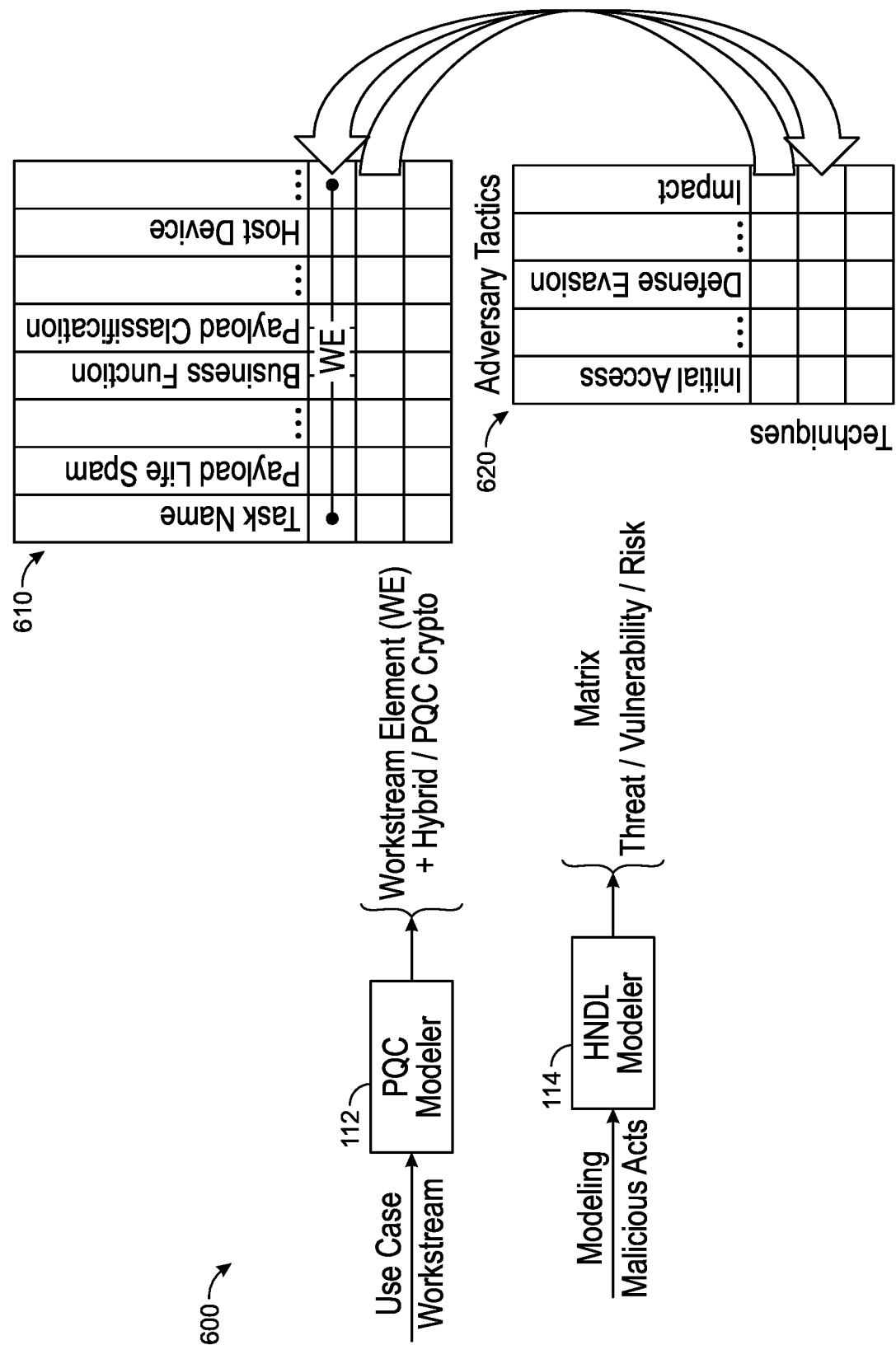
FIG. 6 is an example illustration of a data mapping architecture, according to some arrangements.

Referring now to FIG. 6, a mapping architecture 600 facilitating a structured approach toward connecting cybersecurity workstream elements with associated mitigation strategies and procedures. In some arrangements, the mapping architecture 600 involves two principal data structures: data structure 610, representing a matrix of workstream elements each associated with a PQC algorithm; and data structure 620, which is a matrix detailing Tactics, Techniques, and Procedures (TTP) with identified mitigation strategies per identified adversarial tactics. In the data protection system 110, the PQC modeler 112 and the HNDL modeler 114 interact through the mapping system 116 by receiving and processing their respective outputs. The mapping system 116 can cross-reference (e.g., utilizing clustering or a distance model) data structure 610 with data structure 620 to validate completeness and coherence in the mapping. For example, ensuring that for every cyberattack or cybersecurity threat identified and detailed by the HNDL modeler 114 in data structure 620, there is a clear, corresponding migration path with the PQC modeler 112 output in data structure 610.

In some arrangements, the mapping system 116 checks for congruence, meaning each workstream element from data structure 610 should map to an entry in data structure 620, thereby linking PQC workstream elements to their respective mitigation tactics and techniques in the TTP matrix. If incongruence or missing mappings are identified, mapping system 116 can communicate with HNDL modeler 114 to adjust and update data structure 620 to align with the available workstream elements. An illustration of this might involve a workstream element like "Loan App sign" (disclosed in FIG. 4 of U.S. application Ser. No. 18/047,900) from a loan creation workstream, which could have several attributes such as task name, lifespan, type, size, category, and a corresponding NIST Scenario. In the context of cryptographic functions, like SIGN in the given example, PQC modeler 112 identifies one or more hybrid/PQC encryption algorithms that could mitigate the risks analyzed by HNDL, given the characteristics of the use case and the workstream with its elements. Consequently, each workstream, which may number in the thousands within an organization, can include multiple workstream elements, each having its respective mapping.

Simultaneously, data structure 620, which could be visualized as a cyberattack matrix, incorporates varied tactics (e.g., initial access, defense evasion, impact) and corresponding techniques and procedures to manage and mitigate these tactics, providing a structured methodology for responding to different cybersecurity threats. Thus, when considering a specific workstream element with distinct characteristics, like its data type or currently employed algorithm (e.g., RSA), the mapping system 116 may suggest a migration path (to another algorithm or strategy, potentially involving vendor information and libraries to be used), which subsequently becomes the "seed" to the migration process. Accordingly, as shown, mapping architecture 600 creates a coherent, mapped relationship between the workstream elements and cybersecurity mitigation tactics and strategies, ensuring that every potential threat vector identified has an associated mitigation strategy or migration pathway, aiding in strategic cybersecurity planning and response across the organization's myriad workstreams and associated elements.

Figure 7:
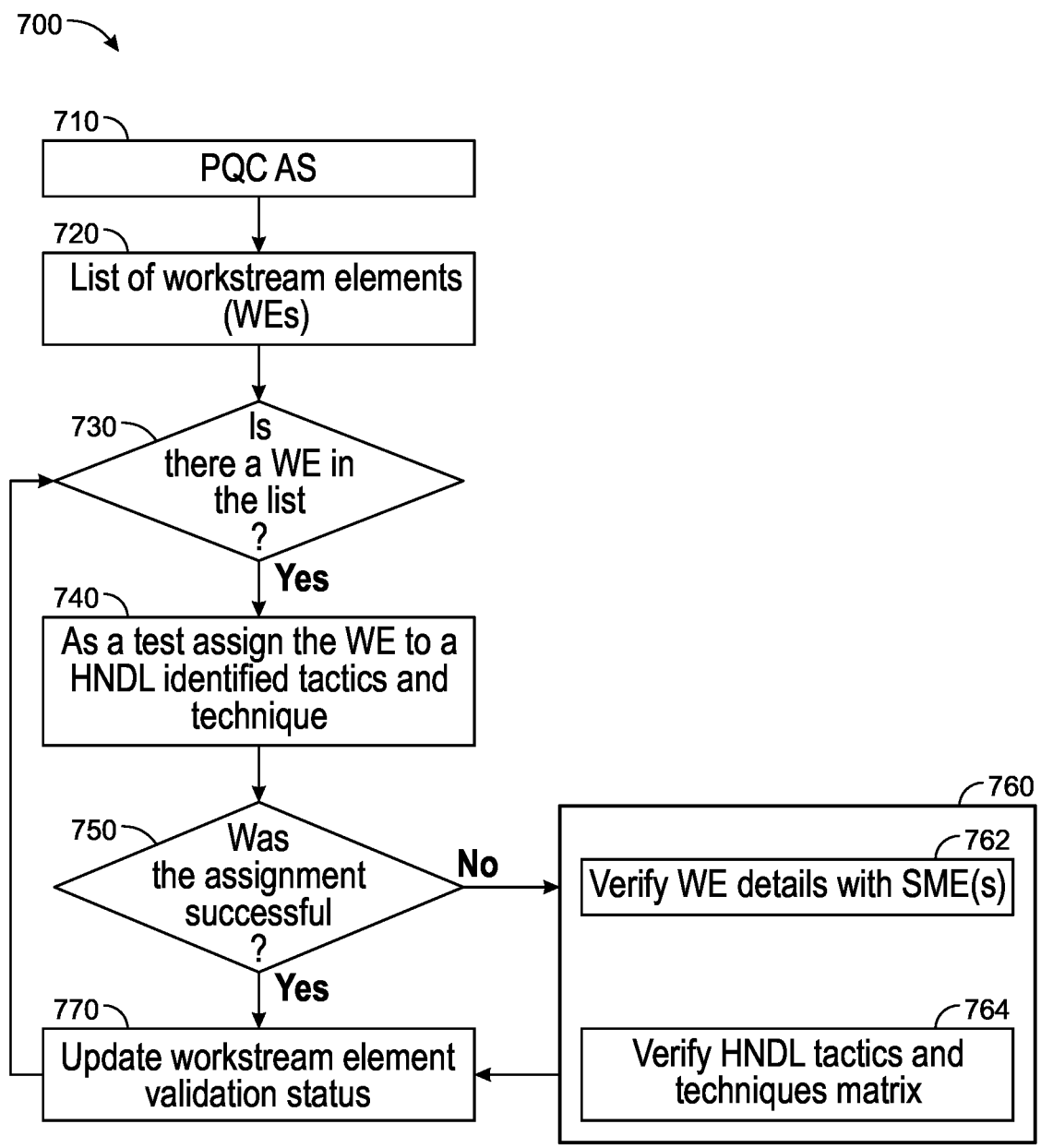
FIG. 7 is a flowchart for a method to verify mapping, according to some arrangements.

Referring now to FIG. 7, illustrating a method 700, depicting a process for verifying the outputs of both PQC modeler 112 and HNDL modeler 114 by interconnecting the PQC workstream elements with HNDL TTPs in a sequence of steps. Initially, PQC modeler 112 outputs an algorithm selection (AS) at block 710, which encompasses a list of cryptographic algorithm selection elements (CASEs) or, in other terms, workstream elements (WEs), at block 720. Moving to block 730, the mapping system 116 analyzes whether a workstream element exists within the listed items. If absent, method 700 concludes its process. Conversely, when a workstream element is present, mapping system 116 assigns (i.e., maps) the WE to a TTP identified by the HNDL modeler 114 (additional details regarding mapping are described above). Subsequently, at block 750, an evaluation occurs wherein the mapping system 116 determines the success of the assignment. This determination is dependent upon whether correlations discovered between protection algorithms (specifically, PQC algorithms) and cybersecurity threats (from the TTP data) can be clustered or evaluated through a distance model, interacting with the group data from both PQC modeler 112 and HNDL modeler 114.

In some arrangements, where the assignment is not successful, the system navigates to block 760, subsequently diverging into blocks 762 and 764. Within block 762, the mapping system 116 can verify the details of the workstream element, cross-referencing with various data sources (e.g., data sources 160) to ensure the veracity of the information. Then, at block 764, the mapping system 116 conducts verification of the HNDL TTP matrix; this could involve ensuring the matrix's completeness, checking for logical consistency among tactics, techniques, and procedures, and possibly contrasting against known cyber threat intelligence to validate its reliability and comprehensiveness.

Concluding, at block 770, the mapping system 116 updates the validation status of the workstream element, modifying it based on the successful or failure of mapping of the workstream elements to the identified HNDL TTPs. In particular, the method 700 may also allow for a reverse verification mechanism, starting at block 710, with HNDL outputting the TTP matrix. This can subsequently be validated against workstream elements and PQC algorithm selection using mapping system 116, ensuring a bi-directional validation and consistency check between PQC and HNDL modelers.

Referring to blocks 740-770 within method 700 in greater details, after the assignment of the workstream element (WE) to a TTP at block 740 (i.e., a mapping occurred), a process of verification occurs, ensuring the effectiveness and accuracy of the mappings. In the phase of assigning the WE to a TTP, block 740 includes the mapping system 116 executing operation, where the inherent properties and cryptographic attributes of the workstream element are correlated with the specific TTPs identified by HNDL modeler 114.

In some arrangements, when the mapping system 116 transitions to block 750, it evaluates whether the previously executed assignment was successfully established. The determination of success is often based on established criteria which may include ensuring that the cryptographic strengths and functionalities of the PQC algorithms are congruent with the requirements needed to nullify or mitigate the threats indicated in the TTP data. It also may include ensuring that the algorithm can be practically implemented within the workstream without infringing upon operational efficiency or introducing new vulnerabilities (e.g., into data systems 140, 145, and/or 150).

In some arrangements, where the assignment is deemed unsuccessful, the subsequent actions bifurcate into blocks 762 and 764, instigating a dual-faceted verification process at block 760. During the process in block 762, mapping system 116 cross-references the details of the WE with various data sources (e.g., data sources 160). This ensures that the workstream element is genuine, accurate, and has not been misinterpreted or misrepresented in the mapping process. Meanwhile, block 764 initiates a verification of the HNDL TTP matrix. This involves ensuring that the tactics, techniques, and procedures within the matrix are coherent and valid, and that they align with real-world cyber threat intelligence and observed adversary behaviors, thus maintaining the reliability and practical applicability of the TTP matrix.

Concluding the method 700 at block 770, mapping system 116 modifies the validation status of the workstream element. This alteration is based on the preceding actions and determinations, ensuring that the final status reflects the efficacy of the mapping and the current validity of the workstream element in relation to the identified TTPs. In some arrangements, it may involve marking the workstream element as successfully validated, requiring reevaluation, or flagging it for further analysis, thereby ensuring a consistent and accurate reflection of the workstream element's state and ensuring optimal cybersecurity posture through effective and verifiable mappings.

In some arrangements, a successful mapping leads to a validation status that signifies a coherent and effective alignment between the workstream element and its corresponding TTP matrix. Here, the PQC algorithm assigned to a workstream element correlates with the counteractive measures or mitigations specified by the associated TTP matrix. It should be understood that this status is not a binary indicator of success but may contain informational annotations or metrics indicating degrees or dimensions of the success. For example, it might elaborate on cryptographic strengths, operational efficiencies, or the anticipated longevity of the efficacy of the mapping in the face of evolving cyber threat landscapes. Subsequently, in practical application, this would mean that the mapped PQC algorithm can proficiently mitigate the cybersecurity threats as articulated by the linked TTP, ensuring robust protection for the data or processes encapsulated by the workstream element.

In contrast, an unmapped workstream element—that is, one for which the mapping to TTP is either non-existent or deemed ineffective-generates a different contour in the validation status. This status becomes important as it triggers an alert to the potential vulnerabilities and prompts for immediate action, given that the workstream element is not under the protective envelope of an effectively mapped PQC algorithm. The validation status for an unmapped workstream element might set into motion a series of analytic and mitigation-planning procedures. For example, it may initiate an identification process for cybersecurity vulnerabilities or misconfigurations, considering the specific attributes and contexts of the unmapped workstream element. The mapping system 116 might employ a set of predefined or dynamically generated criteria, drawing from historical data, current cyber threat intelligence, and the intrinsic properties of the workstream element itself, to detect potential threat vectors and vulnerabilities.

In some arrangements, there is an element of prioritization in dealing with unmapped workstream elements. The mapping system 116 could evaluate the frequency of the unmapped workstream element across other workstreams, attributing a priority status based on its prevalence and the potential risk magnitude. This priority could be on a linear and/or dimensional scale, considering aspects like the criticality of the workstream to organizational operations, the sensitivity of the data involved, and the potential impact of a cybersecurity breach on broader organizational contexts. By performing a focused analysis on the unmapped workstream element, vulnerabilities might be thoroughly understood and subsequently mitigated. Mitigation techniques can be identified and prioritized. This prioritization could be informed by factors like the pervasiveness of the element across multiple workstreams, the severity of the associated vulnerabilities, and the potential organizational impact of a cybersecurity incident involving the workstream element.

Figure 8:
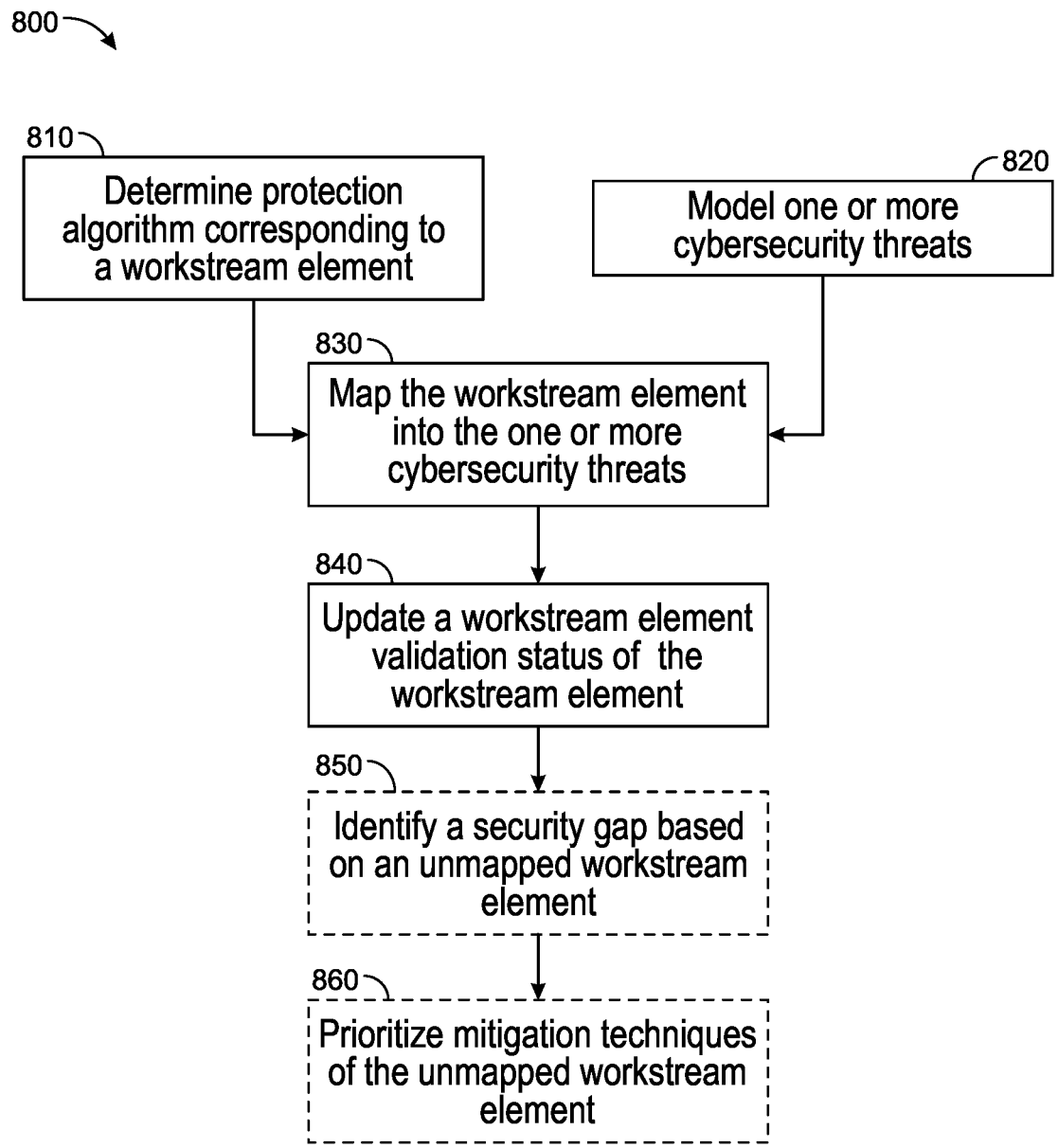
FIG. 8 is a flowchart for a method of data protection, according to some arrangements.

Referring now to FIG. 8, a flowchart for a method 800 for data protection is shown, according to some embodiments. Data protection system 110 can be configured to perform method 800. Further, any computing device described herein can be configured to perform method 800.

In broad overview of method 800, at block 810, the one or more processing circuits (e.g., data protection system 110 in FIG. 1) can determine a protection algorithm corresponding to a workstream element. At block 820, the one or more processing circuits can model one or more cybersecurity threats. At block 830, the one or more processing circuits can map the workstream element into the one or more cybersecurity threats. At block 840, the one or more processing circuits can update a workstream element validation status of the workstream element. At block 850, the one or more processing circuits can identify a security gap based on an unmapped workstream element. At block 860, the one or more processing circuits can prioritize mitigation techniques of the unmapped workstream element. Additional, fewer, or different operations may be performed depending on the particular arrangement. In some embodiments, some, or all operations of method 800 may be performed by one or more processors executing on one or more computing devices, systems, or servers. In various embodiments, each operation may be re-ordered, added, removed, or repeated.

In general, the one or more processing circuits of method 800 can include sever several components, namely data systems 140, 145, and 150 that execute a workstream, a first modeler (e.g., PQC modeler 112), a second modeler (e.g., HNDL modeler 114), and a mapping system 116. The data systems can execute a workstream, including distinct workstream elements, each representing a different step or stage within the workstream, to ensure systematic operation. The PQC modeler 112 determines protection algorithms for these workstream elements, basing its determinations on input data regarding response and algorithm data. The protection algorithms are used to safeguard the data and operational integrity of the workstream against potential quantum computing threats.

In some arrangements, the input data to the PQC modeler 112 (i.e., the first modeler), which may be structured as a tuple, includes information about various response and algorithm data. The PQC modeler 112 can analyze this input data and provide an output that details selected PQC algorithms and legacy algorithms, each algorithm linked with specific parameters tied to individual workstream elements. In particular, the PQC modeler 112 can establish parameters for each protection algorithm and renders output as tuples (or another type of data structure), each containing a protection algorithm and a corresponding legacy algorithm, providing a connection between cryptographic protections and pre-existing cryptographic algorithms.

In some arrangements, the HNDL modeler 114 (i.e., the second modeler) can model cybersecurity threats pertinent to the data systems. The output from HNDL modeler 114, structured as a matrix (or another type of data structure), categorizes various hierarchies related to technological infrastructures and platforms, linking each cell within a specified hierarchy to distinct adversary tactics and associated techniques, procedures, and mitigation strategies. This methodology provides a structured approach to be maintained across all cells in a cyberattack matrix, addressing cybersecurity threats in a structured manner across technological domains and infrastructures.

In some arrangements, the mapping system 116 (i.e., the mapping system) can map workstream elements into cybersecurity threats based on correlations between the protection algorithms and cybersecurity threats. These correlations align the protection algorithms, determined by the PQC modeler 112, with the cybersecurity threats modeled by the HNDL modeler 114, utilizing one or more alignment techniques in the cryptographic protection migration. In particular, this is implemented to generate a mapping that aims to reduce a threat vector surface. Furthermore, it updates a workstream element validation status based on the mapping of the workstream elements, ensuring that the state of each element is consistently recorded and updated in alignment with its threat status.

Accordingly, the interactions between the modelers and the mapping system provides a quantum protection architecture that can identify and establish protection algorithms related to workstream elements and model cybersecurity threats and correlate them to these identified algorithms, aiming to minimize threat vector surfaces and maintain an updated validation status of the workstream elements. Thus, the quantum protection architecture provides improved integration of post-quantum cryptographic techniques with legacy systems, while simultaneously maintaining the adaptability to evolving cybersecurity threats.

In some arrangements, the one or more data systems store a plurality of data assets utilized in the execution of the workstream, and wherein the one or more cybersecurity threats correspond to data vulnerabilities of the plurality of data assets utilized in the execution of the workstream. For example, in an ATM withdrawal scenario, data assets like personal identification numbers (PINs), account numbers, and transaction amounts are used in the successful execution of a withdrawal workstream. A cybersecurity threat could exploit vulnerabilities such as insecure data transmission between the ATM terminal and the banking server, potentially leading to unauthorized access to sensitive user data. Considering the advent of quantum computing and its potential to crack widely-used encryption methods likeRSA-2048, method 800 could identify and employ a quantum-resistant cryptographic algorithm, such as lattice-based cryptography, to secure communication channels and protect data assets from interception and unauthorized access. Similarly, in the context of online banking transactions, wherein data assets like usernames, passwords, and transaction authentication numbers (TANs) are collected and transmitted, the system could utilize post-quantum secure protocols to protect against phishing and man-in-the-middle attacks. By integrating quantum-resistant multi-factor authentication (MFA) and employing quantum-secure communication protocols, the system can ensure robust data protection and verification throughout every phase of the workstream.

At block 810, the processing circuits can determine one or more protection algorithms corresponding to one or more workstream elements of a workstream of one or more data systems. The determinations can be based on the specifics of the input data, which could include algorithm and response data. The algorithm data could include details about the PQC algorithm such as key sizes, signature size, cipher text length, and benchmark data. The response data could encapsulate a spectrum of data from various mitigation strategies to detection mechanisms. The output of a protection algorithm provides one or more workstream elements a viable data protection pathway.

In some arrangements, the identification of a PQC protection algorithm can include an analysis of both the cryptographic strength and the computational efficiency of available algorithms. The efficiency is often evaluated in terms of key sizes, signature sizes, and computational overhead, ensuring that the chosen algorithm can be effectively implemented within the existing technological infrastructure without inducing prohibitive computational burdens. Furthermore, the cryptographic strength is assessed by analyzing the resistance of available PQC algorithms to both classical and quantum-based cryptographic attacks, providing data protection even in scenarios where an adversary has access to quantum computational capabilities. Additionally, at block 810 an examination of the integration capability of the PQC algorithm with existing cryptographic frameworks can occur, ensuring that a transition from classical to quantum-resistant algorithms can be facilitated.

In some arrangements, the processing circuits can utilize workstreams and algorithm elements to process input data and generate output regarding optimal cryptography for one or more workstream elements. Workstreams can be constructed sequences of algorithm elements, each representing a discrete unit or component within a larger computational or data processing procedure (e.g., withdrawing cash from an ATM, loan document signing, etc.). Algorithm elements, as tied to workstreams, dictate specific actions (e.g., cryptographic or non-cryptographic) or behaviors that are to be executed within that segment of the process. Thus, the workstream can be a systematic roadmap guiding the data from input through various algorithmic actions to generate the desired output. Furthermore, the workstream elements (WEs) can represent a linear progression which can be an interconnected pathway where the data must be examined and acted upon. This data may include an array of information, including aspects related to response data and PQC algorithm data.

Moreover, the integration of artificial intelligence (AI) or machine learning (ML) algorithms with PQC modeler 112 provides a framework where these workstream elements are not statically defined but can adapt and evolve in response to shifting computational requirements and cybersecurity threats. The application of AI or ML here, through defining parameters for protection algorithms and constructing relations between them, represents an interplay between structured, rule-based computational processes and dynamic, learning-oriented adaptive algorithms. This interplay enables the processing circuits to adapt its processing mechanisms in real-time (or near real-time), optimizing its operations to the changing landscape of cybersecurity threats and the shifting computational capabilities and requirements of the data systems involved.

In some arrangements, each workstream element of the one or more workstream elements correspond to a cryptographic operation or a cybersecurity operation, and wherein the one or more protection algorithms comprise at least a cryptographic algorithm or a hybrid cryptographic algorithm. Additionally, the chosen cryptographic algorithms might be selected, or dynamically adapted, based on the nature, sensitivity, and contextual use of the data being processed within each respective workstream element. For example, data segments requiring heightened confidentiality, such as personally identifiable information (PII) or financial transactions, may be processed using an algorithm prioritizing secrecy and integrity, such as a lattice-based cryptographic scheme. Conversely, workstream elements dealing with non-sensitive, public, or less critical data may employ a lightweight cryptographic mechanism to optimize computational efficiency without overly compromising security. The hybrid cryptographic algorithm may employ a combination of a legacy algorithm and a PQC algorithm or hybrid can also be a PQC algorithm and a newer PQC algorithm, to meet the needs of transitioning from one cryptographic algorithm to another cryptographic algorithm while balancing with the needs for security, computational efficiency, and regulatory compliance in diverse operational contexts and against varied threat vectors.

At block 820, the one or more processing circuits can model one or more cybersecurity threats of the one or more data systems. It should be understood that blocks 810 and 820 can be performed in parallel or sequentially and both outputs can be used in mapping. Here, a structured cybersecurity threat matrix is constructed, wherein each matrix cell represents a unique amalgamation of adversary tactics and associated mitigation strategies, each aligned with a specific technological platform or infrastructure. This methodology is used to categorize and understand the cybersecurity threats and to provide a mechanism through which these threats can be systematically addressed, allowing for a data protection approach that mitigates identified threats and vulnerabilities across various technology domains. Furthermore, the outputs generated in blocks 810 and 820 can serve as correlated inputs, contributing to a mapping mechanism that identifies how specific protection algorithms can directly address particular cybersecurity threats in a coherent and structured manner.

In some arrangements, modeling cybersecurity threats include an analysis of Tactics, Techniques, and Procedures (TTP) data. This data can provide insights into the method of potential adversaries, providing a framework that details the various methods that might be employed to compromise data systems. Each tactic, representing a broad objective of the adversary, is aligned with various techniques, which denote the general approach taken to achieve this objective. These techniques are, in turn, linked with procedures that detail specific methods employed to implement the technique. For example, a tactic of gaining persistence might be linked with a technique involving compromising client software binaries and a procedure that utilizes malicious browser applications to replace legitimate software.

Through modeling of TTP data, cybersecurity threats can be identified and categorized, providing a basis through which mitigation strategies can be formulated.

Additionally, referring to blocks 810 and 820 together, the first modeler, implemented for post-quantum cryptography (PQC), establishes a framework where the processing circuits identify and applies numerous parameters for each protection algorithm, creating and outputting multiple tuples for one or more workstream elements, each of which includes a specified protection algorithm and its corresponding legacy algorithm for one or more workstream elements. For example, the processing circuits might determine specific parameters, like key size and encryption method, for a quantum-resistant algorithm, pairing it with an equivalent traditional RSA algorithm in a tuple. The processing circuits can also utilizes machine learning or artificial intelligence to correlate protection algorithms with specific workstream elements, utilizing a database (e.g., database 120) enriched with various algorithmic performance metrics and resource requirements of the involved data systems. For example, the processing circuits might use machine learning to relate a new quantum-resistant algorithm with a workstream that involves secure message transmission. In some arrangements, the second modeler, implemented for HNDL, analyzes multiple frameworks, threat models, or matrices to pinpoint diverse cybersecurity threats. In practical terms, it might collect and analyze a cybersecurity framework to identify potential threats, such as vulnerability to quantum attacks, based on patterns and historical data. This modeling of threats involves defining both short-term and long-term controls for mitigation. For example, upon identifying a potential threat vector via malware, it may propose an immediate malware scan (short-term control) and a subsequent system-wide upgrade of malware detection capabilities (long-term control). Moreover, the processing circuits can generate a prioritized list of cybersecurity threats to mitigate the cybersecurity risk of the data systems. For example, the processing circuits could prioritize threats impacting sensitive user data above others, thereby allocating or assigning resources (e.g., threat prevention systems or software) more effectively to safeguarding critical aspects of the system.

In some arrangements, a workstream element of the one or more workstream elements corresponds to (1) a first protection algorithm determined based on testing the workstream element against a closed source library and (2) a second protection algorithm determined based on testing the workstream element against an open source library. For example, the first protection algorithm might be derived from a proprietary, closed-source cryptographic library, such as RSA BSAFE. Alternatively, the second protection algorithm may be selected from an open-source cryptographic library, such as OpenSSL. Both protection algorithms can provide security while balancing factors like licensing costs, transparency, and community support, depending on organizational needs and regulatory compliance prerequisites.

At block 830, the processing circuits can map the one or more workstream elements of the workstream into the one or more cybersecurity threats based on one or more correlations between the one or more protection algorithms and the one or more cybersecurity threats, wherein the one or more correlations correspond to a cryptographic protection migration one or more alignment techniques to align the one or more protection algorithms, determined by the first modeler, with the one or more cybersecurity threats, modeled by the second modeler, to generate a mapping that reduces a threat vector surface. In particular, having identified both the PQC algorithms and cybersecurity threats, a mapping is executed, aligning specific threats with corresponding mitigation strategies offered by available PQC algorithms. This includes determining how the cryptographic strength and operational mechanics of available algorithms can counteract identified cybersecurity threats, providing protection against potential adversary actions. Moreover, the mapping ensures that chosen PQC algorithms are not only cryptographically secure but also operationally attuned to the specific threat landscape encountered by the data systems 140, 145, and 150, offering a structured data protection strategy that is aligned with the operational, security, and performance contexts of the system.

In general, the mapping phase synthesizes data originating from cryptographic and cybersecurity data streams, where PQC algorithm data and cybersecurity threat vectors, embodied in Tactics, Techniques, and Procedures (TTP) data, are merged (or combined) into a unified mapping. This mapping process, leverages an algorithmic methodology using one or more alignment techniques, wherein the mapping, executed by the processing circuits, constructs an alignment between identified cybersecurity threats and suitable cryptographic countermeasures, providing the data systems protected postures against potential adversarial cyber actions. Moreover, the mapping mechanism ensures that the PQC algorithm, identified by the PQC modeler 112, is configured or implemented to counteract, mitigate, or neutralize the cybersecurity threats, as modeled by the HNDL modeler 114, thereby reducing the overall threat vector surface by blocking or safeguarding potential cybersecurity infiltration or attack routes.

Furthermore, the mapping executed within block 830 utilizes the cryptographic characteristics intrinsic to both the PQC algorithm data and the TTP data, determining correlations that can form the mapping. In some arrangements, such correlations can feature a cryptographic synergy between the respective datasets, ensuring that the selected PQC algorithm(s) is/are not only capable of mitigating identified threats but also optimizing the algorithm's performance and applicability within real-world operating environments. Additionally, mapping employs a mechanism where the generated mappings are capable of evolving in response to the shifting landscapes of both cryptographic advancements and emerging cybersecurity threats. Therefore, as new threats are identified and as PQC algorithms update or new algorithms are developed, the mapping mechanism can recalibrate, realign, and regenerate mappings to ensure persistent and relevant cryptographic protection against newly emergent or morphing cybersecurity threat vectors.

In some arrangements, reducing the threat vector surface corresponds to a reduced set of potential attack pathways, optimized through alignment of the modeled one or more cybersecurity threats with corresponding the determined one or more cryptographic algorithms. For example, a specific cybersecurity threat, such as a quantum-enabled cyber-attack targeting classical RSA encryption, can be optimally mapped with a PQC algorithm like Lattice-based cryptography. By utilizing this mapping, the processing circuits narrows down the threat vector by negating the effectiveness of the quantum-enabled attack, thereby reducing the risk to the encrypted data and ensuring sustained data integrity and confidentiality. In another example, the threat vector might be reduced by mitigating against side-channel attacks which seek to exploit the physical implementation of cryptographic algorithms. A pertinent PQC algorithm, such as one focusing on minimizing computational and power variations to obfuscate side-channel signatures, may be mapped to this specific threat. This might involve the alignment of Supersingular Isogeny Key Encapsulation (SIKE). Thus, through these mappings, not only is the cryptographic stance of the system augmented, but by directing countermeasures that are tailored to specific threats, the overall security posture is enhanced, enabling a more targeted defensive mechanism against diverse and sophisticated cybersecurity threats.

At block 840, the processing circuits can update a workstream element validation status of the one or more workstream elements based on the mapping of the one or more workstream elements. The validation status serves as an indicator, signifying various metrics and annotations, which might detail cryptographic robustness, operational aptitude, and the prospective durability of the mapping during a continually evolving cyber threat landscape. When encountering an unmapped (or not accurately mapped) workstream element, the validation status can bs used as a critical alert, prompting an immediate analytic and mitigation-planning response, thereby safeguarding the integrity of the data or processes enveloped within the workstream element. In some arrangements, updating the workstream element validation status including updating the one or more workstream elements with the one or more protection algorithms, the one or more data systems encrypt and decrypt the plurality of data assets prior to receiving or sending a transmission that includes a plurality of encrypted data assets, and wherein the one or more data systems is configured to encrypt the plurality of data assets using one or more asymmetric keys. In some arrangements, updating the workstream element validation status includes reflecting at least one of a state of mapping (e.g., aligning Quantum-resistant cryptographic algorithms with identified threats within the data flow), a state of threat mitigation (e.g., deploying post-quantum cryptographic solutions or implementing multi-factor authentication to guard against quantum attacks), or a state of algorithm selection of the workstream (e.g., choosing Lizard over NTRU, due to comparative analysis of their resistance to quantum computational attacks and applicability to the specific data use-case scenarios).

In some arrangements, the processing circuits can verify the updated workstream element validation status of the workstream against a same workstream element of a different workstream, wherein verifying comprises identifying a valid difference or a valid consistency between the workstream and the different workstream, and wherein the valid difference is based on one or more different environmental requirements. For example, if a workstream element corresponds to the cryptographic algorithm implementation in a banking transaction system, a valid difference might pertain to variances in encryption key lengths or algorithm types, necessitated by different regional regulatory compliances or technological infrastructures. Conversely, a valid consistency might entail the uniform application of a PQC algorithm across varying workstreams, such as RSA for secure email transmission and TLS for web security, to mitigate a consistently identified threat, ensuring cryptographic robustness despite disparate functional applications.

At optional block 850, the processing circuits can identify one or more cybersecurity vulnerabilities or misconfigurations (i.e., security gaps) based on at least one unmapped workstream element. This can include scanning through the operational parameters, data interactions, and dependencies within the workstream, using predefined or adaptive algorithms to locate potential weak points or exploit avenues (i.e., security gaps). In some arrangements, the scanning and analysis can include using a differential analysis to identify discrepancies between expected and actual data flow patterns, static and dynamic code analysis to identify potential insecure code practices or possible injection points, and dependency checking to confirm that all data and control paths are analyzed for vulnerabilities. Furthermore, the processing circuits could employ anomaly detection algorithms to discern any atypical behavior or data transmissions related to the unmapped workstream element.

At optional block 860, the processing circuits can prioritize mitigation techniques of the at least one unmapped workstream element based on a number of times the at least one unmapped workstream element is present in other workstreams. It should be understood that while optional boxes are shown, in some arrangements, blocks 810-840 may also be optional, and in some arrangements, all the blocks 810-860 may be optional based on the particular scenario or use case. Prioritization might include using a weighted system, wherein workstream elements that recurrently appear in numerous workstreams without effective mapping are accorded a higher threat level, thus directing urgent attention and resources toward developing and applying requisite protective measures.

While this specification contains many specific implementation details and/or arrangement details, these should not be construed as limitations on the scope of any disclosure or of what may be claimed, but rather as descriptions of features specific to particular implementations and/or arrangements of the systems and methods described herein. Certain features that are described in this specification in the context of separate implementations and/or arrangements can also be implemented and/or arranged in combination in a single implementation and/or arrangement. Conversely, various features that are described in the context of a single implementation and/or arrangement can also be implemented and arranged in multiple implementations and/or arrangements separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Additionally, features described with respect to particular headings may be utilized with respect to and/or in combination with illustrative arrangement described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations and/or arrangements described above should not be understood as requiring such separation in all implementations and/or arrangements, and it should be understood that the described program components and systems can generally be integrated together in a single software product or packaged into multiple software products.

Having now described some illustrative implementations, implementations, illustrative arrangements, and arrangements it is apparent that the foregoing is illustrative and not limiting, having been presented by way of example. In particular, although many of the examples presented herein involve specific combinations of method acts or system elements, those acts, and those elements may be combined in other ways to accomplish the same objectives. Acts, elements and features discussed only in connection with one implementation and/or arrangement are not intended to be excluded from a similar role in other implementations or arrangements.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations and/or arrangements consisting of the items listed thereafter exclusively. In one arrangement, the systems and methods described herein consist of one, each combination of more than one, or all of the described elements, acts, or components.

Any references to implementations, arrangements, or elements or acts of the systems and methods herein referred to in the singular may also embrace implementations and/or arrangements including a plurality of these elements, and any references in plural to any implementation, arrangement, or element or act herein may also embrace implementations and/or arrangements including only a single element. References in the singular or plural form are not intended to limit the presently disclosed systems or methods, their components, acts, or elements to single or plural configurations. References to any act or element being based on any information, act or element may include implementations and/or arrangements where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

Any arrangement disclosed herein may be combined with any other arrangement, and references to "an arrangement," "some arrangements," "an alternate arrangement," "various arrangements," "one arrangement" or the like are not necessarily mutually exclusive and are intended to indicate that a particular feature, structure, or characteristic described in connection with the arrangement may be included in at least one arrangement. Such terms as used herein are not necessarily all referring to the same arrangement. Any arrangement may be combined with any other arrangement, inclusively or exclusively, in any manner consistent with the aspects and arrangements disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations and/or arrangements are illustrative rather than limiting of the described systems and methods. Scope of the systems and methods described herein is thus indicated by the appended claims, rather than the foregoing description, and changes that come within the meaning and range of equivalency of the claims are embraced therein.

It should be understood that no claim element herein is to be construed under the provisions of 35 U.S.C. § 112(f) unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor. In some embodiments, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc.

Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), math-based currencies (often referred to as cryptocurrencies), and central bank digital currency (often referred to as CBDC). Examples of math-based currencies include Bitcoin, Ethereum, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied.

The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

What is claimed is:

1. A system, comprising:
  one or more data systems configured to execute a sequence of computer-based operations;
  one or more processors configured to:
  determine, using a first modeler, one or more quantum-resistant algorithms corresponding to one or more network entry points of the sequence of computer-based operations;
  model, using a second modeler, one or more quantum-based threats of the one or more data systems;
  execute a cryptographic distance model configured to identify one or more correlations between the one or more quantum-resistant algorithms and the one or more quantum-based threats;
  generate a mapping of the one or more network entry points of the sequence of computer-based operations into the one or more quantum-based threats based on the one or more correlations between the one or more quantum-resistant algorithms and the one or more quantum-based threats, wherein the one or more correlations correspond to a cryptographic protection migration employing an alignment technique to update or replace one or more legacy algorithms associated with the one or more network entry points with the one or more quantum-resistant algorithms and prevent the one or more quantum-based threats by reducing a threat vector surface associated with the one or more network entry points; and
  update a validation status based on the mapping of the one or more network entry points.

2. The system of claim 1, wherein the first modeler is a post-quantum cryptography (PQC) modeler further configured to determine a plurality of parameters for each of the one or more quantum-resistant algorithms, and wherein the first modeler is further configured to output a plurality of tuples, each of the plurality of tuples comprising a quantum-resistant algorithm and a corresponding legacy algorithm.

3. The system of claim 1, wherein the one or more processors are further configured to map and correlate, via the first modeler utilizing a trained machine learning (ML) algorithm or a trained artificial intelligence (AI) algorithm, the one or more quantum-resistant algorithms with the corresponding one or more network entry points, utilizing a predefined and periodically updated database of algorithmic performance metrics and resource requirements of the one or more data systems.

4. The system of claim 1, wherein the second modeler is a harvest now decrypt later (HNDL) modeler further configured to analyze at least one of frameworks, threat models, or matrices to identify the one or more quantum-based threats.

5. The system of claim 4, wherein modeling the one or more quantum-based threats comprises determining at least one of a short-term control to mitigate the one or more quantum-based threats and a long-term control to mitigate the one or more quantum-based threats.

6. The system of claim 4, wherein modeling the one or more quantum-based threats comprises generating a prioritization list of the one or more quantum-based threats corresponding to lower an overall cybersecurity risk of the one or more data systems.

7. The system of claim 1, wherein the one or more data systems store a plurality of data assets utilized in the execution of the sequence of computer-based operations, and wherein the one or more quantum-based threats corresponds to data vulnerabilities of the plurality of data assets utilized in the execution of the sequence of computer-based operations.

8. The system of claim 7, wherein before updating the validation status comprising updating the one or more network entry points with the one or more quantum-resistant algorithms, the one or more data systems encrypt and decrypt the plurality of data assets prior to receiving or sending a transmission that comprises a plurality of encrypted data assets, and wherein the one or more data systems is configured to encrypt the plurality of data assets using one or more asymmetric keys.

9. The system of claim 1, wherein at least one of the one or more network entry points remains unmapped, and wherein the one or more processors are further configured to:
identify one or more cybersecurity vulnerabilities or misconfigurations based on at least one unmapped network entry point; and
prioritize mitigation techniques of the at least one unmapped network entry point based on a number of times the at least one unmapped network entry point is present in other sequences of computer-based operations.

10. The system of claim 1, wherein updating the validation status comprises reflecting at least one of a state of mapping, a state of threat mitigation, or a state of algorithm selection, and wherein the alignment technique is at least one of a clustering modeling technique or a distance modeling technique that aligns the first modeler and the second modeler.

11. The system of claim 1, wherein reducing the threat vector surface corresponds to a reduced set of potential attack pathways, optimized through alignment of the modeled one or more quantum-based threats with the determined one or more quantum-resistant algorithms.

12. The system of claim 1, wherein each of the one or more network entry points corresponds to a cryptographic operation or a cybersecurity operation, and wherein the one or more quantum-resistant algorithms comprise at least a cryptography algorithm or a hybrid cryptograph algorithm.

13. The system of claim 1, wherein a network entry point of the one or more network entry points corresponds to (1) a first quantum-resistant algorithm determined based on testing the network entry point against a closed source library and (2) a second quantum-resistant algorithm determined based on testing the network entry point against an open source library.

14. The system of claim 1, wherein the one or more processors are further configured to:
verify the updated validation status a same network entry point of a different sequence of computer-based operations, wherein verifying comprises identifying a valid difference or a valid consistency between the sequence of computer-based operations and the different sequence of computer-based operations, and wherein the valid difference is based on one or more different environmental requirements.

15. A method of data protection, comprising:
determining, by one or more processing circuits, one or more quantum-resistant algorithms corresponding to one or more network entry points of a sequence of computer-based operations of one or more data systems;
modeling, by the one or more processing circuits, one or more quantum-based threats of the one or more data systems;
executing, by the one or more processing circuits, a cryptographic distance model configured to identify one or more correlations between the one or more quantum-resistant algorithms and the one or more quantum-based threats;
generating, by the one or more processing circuits, a mapping of the one or more network entry points of the sequence of computer-based operations into the one or more quantum-based threats based on the one or more correlations between the one or more quantum-resistant algorithms and the one or more quantum-based threats, wherein the one or more correlations correspond to a cryptographic protection migration employing an alignment technique to update or replace one or more legacy algorithms associated with the one or more network entry points with the one or more quantum-resistant algorithms and prevent the one or more quantum-based threats by reducing a threat vector surface associated with the one or more network entry points; and
updating, by the one or more processing circuits, a validation status based on the mapping of the one or more network entry points.

16. The method of claim 15, wherein determining the one or more quantum-resistant algorithms further comprises determining a plurality of parameters for each of the one or more quantum-resistant algorithms and outputting a plurality of tuples, each of the plurality of tuples comprising a quantum-resistant algorithm and a corresponding legacy algorithm.

17. The method of claim 15, wherein modeling the one or more quantum-based threats comprises determining at least one of a short-term control to mitigate the one or more quantum-based threats and a long-term control to mitigate the one or more quantum-based threats, and wherein modeling the one or more quantum-based threats comprises generating a prioritization list of the one or more quantum-based threats corresponding to lower an overall cybersecurity risk of the one or more data systems.

18. The method of claim 15, wherein at least one of the one or more network entry points remains unmapped, and wherein the method further comprises:
identifying, by the one or more processing circuits, one or more cybersecurity vulnerabilities or misconfigurations based on at least one unmapped network entry point; and
prioritizing, by the one or more processing circuits, mitigation techniques of the at least one unmapped network entry point based on a number of times the at least one unmapped network entry point is present in other sequences of computer-based operations.

19. The method of claim 15, wherein each of the one or more network entry points corresponds to a cryptographic operation or a cybersecurity operation, and wherein the one or more quantum-resistant algorithms comprise at least a cryptography algorithm or a hybrid cryptograph algorithm, and wherein a network entry point of the one or more network entry points corresponds to (1) a first quantum-resistant algorithm determined based on testing the network entry point against a closed source library and (2) a second quantum-resistant algorithm determined based on testing the network entry point against an open source library.

20. One or more non-transitory computer-readable storage media having instructions stored thereon that, when executed by at least one processing circuit, causes the at least one processing circuit to:
  determine one or more quantum-resistant algorithms corresponding to one or more network entry points of a sequence of computer-based operations of one or more data systems;
  model one or more quantum-based threats of the one or more data systems;
  execute a cryptographic distance model configured to identify one or more correlations between the one or more quantum-resistant algorithms and the one or more quantum-based threats;
  generate a mapping of the one or more network entry points of the sequence of computer-based operations into the one or more quantum-based threats based on the one or more correlations between the one or more quantum-resistant algorithms and the one or more quantum-based threats, wherein the one or more correlations correspond to a cryptographic protection migration employing an alignment technique to update or replace one or more legacy algorithms associated with the one or more network entry points with the one or more quantum-resistant algorithms and prevent the one or more quantum-based threats by reducing a threat vector surface associated with the one or more network entry points; and
  update a validation status based on the mapping of the one or more network entry points.

* * * * *